United States Patent
Lee et al.

(10) Patent No.: US 12,469,543 B2
(45) Date of Patent: Nov. 11, 2025

(54) MEMORY CORE CIRCUITS HAVING CELL-ON-PERIPHERY STRUCTURES AND MEMORY DEVICES INCLUDING THE SAME

(71) Applicant: Samsung Electronics Co., Ltd., Suwon-si (KR)

(72) Inventors: Hoseok Lee, Suwon-si (KR); Younghun Seo, Suwon-si (KR); Kangsub Jeong, Suwon-si (KR); Sangyun Kim, Suwon-si (KR); Dongil Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 18/325,307

(22) Filed: May 30, 2023

(65) Prior Publication Data

US 2024/0096403 A1    Mar. 21, 2024

(30) Foreign Application Priority Data

Sep. 21, 2022  (KR) .......................... 10-2022-0119052

(51) Int. Cl.
  *G11C 11/4091*  (2006.01)
  *G11C 11/408*   (2006.01)
(52) U.S. Cl.
  CPC ...... *G11C 11/4091* (2013.01); *G11C 11/4085* (2013.01); *G11C 11/4087* (2013.01)
(58) Field of Classification Search
  CPC ............ G11C 11/4091; G11C 11/4085; G11C 11/4087

USPC ................................................... 365/189.011
See application file for complete search history.

(56) References Cited

U.S. PATENT DOCUMENTS

| | | |
|---|---|---|
| 7,606,087 B2 | 10/2009 | Lee |
| 7,864,599 B2 | 1/2011 | Chang et al. |
| 8,189,406 B2 | 5/2012 | Chang et al. |
| 8,611,122 B2 | 12/2013 | Kajigaya |
| 8,750,063 B2 | 6/2014 | Choi |
| 9,666,289 B2 | 5/2017 | Lee et al. |

(Continued)

FOREIGN PATENT DOCUMENTS

| | | |
|---|---|---|
| KR | 101442174 B1 | 9/2014 |
| KR | 20220018343 A | 2/2022 |

*Primary Examiner* — Amir Zarabian
*Assistant Examiner* — Daniel J King
(74) *Attorney, Agent, or Firm* — Wolf, Greenfield & Sacks, P.C.

(57) ABSTRACT

A memory core circuit includes: (i) a memory cell array having sub cell arrays therein, and (ii) a core control circuit having sub peripheral circuits therein, such that each sub peripheral circuit extends underneath a corresponding sub cell array. Each sub cell array includes memory cells respectively connected to wordlines and bitlines. Each sub peripheral circuit includes sub wordline drivers configured to drive the wordlines, bitline sense amplifiers configured to sense voltages of the bitlines, a row decoding circuit configured to control the sub wordline drivers to select one of the wordlines, a power circuit configured to supply power to each sub peripheral circuit, and a control circuit configured to control operation of each sub peripheral circuit. By using a CoP structure that efficiently provides the core control circuit, the size of the memory core circuit may be reduced and a design margin may be enhanced.

20 Claims, 23 Drawing Sheets

(56) References Cited

U.S. PATENT DOCUMENTS

| | | |
|---|---|---|
| 10,026,747 B2 | 7/2018 | Hwang et al. |
| 10,790,025 B2 | 9/2020 | Yamaoka |
| 11,205,461 B2 | 12/2021 | Onuki et al. |
| 11,227,861 B2 | 1/2022 | Fujisawa et al. |
| 2012/0213018 A1 | 8/2012 | Chang et al. |
| 2018/0150592 A1* | 5/2018 | Chang .................... H10D 89/10 |
| 2021/0027830 A1 | 1/2021 | Kim et al. |
| 2021/0134836 A1 | 5/2021 | Ahn |
| 2022/0013181 A1 | 1/2022 | Hioka et al. |
| 2022/0045045 A1 | 2/2022 | Lee |
| 2022/0115393 A1* | 4/2022 | Yu .......................... H10B 41/27 |

* cited by examiner

MEMORY CORE CIRCUITS HAVING CELL-ON-PERIPHERY STRUCTURES AND MEMORY DEVICES INCLUDING THE SAME

REFERENCE TO PRIORITY APPLICATION

This U.S. non-provisional application claims priority under 35 USC § 119 to Korean Patent Application No. 10-2022-0119052, filed Sep. 21, 2022, the disclosure of which is hereby incorporated herein by reference.

BACKGROUND

1. Technical Field

Example embodiments relate generally to semiconductor integrated circuits, and more particularly, to a memory core circuits that efficiently utilize a cell-on-periphery (CoP) structure and memory devices including the memory core circuit therein.

2. Discussion of the Related Art

As high-performance electronic products are required to be miniaturized and multifunctional, a high degree of integration is required to provide a high-capacity integrated circuit device. As the feature size of a memory device, such as a DRAM (Dynamic Random Access Memory) device, decreases, more efficient arrangements of circuits for driving the memory device are required.

A conventional DRAM device typically has an open bit line structure, in which two bit lines forming a complementary pair exist on different cell blocks, and the bit line sense amplifier is spread left and right. According to the limitations associated with typical implementations of the cell transistor of the conventional DRAM device and the increases in implementation difficulty, research is being conducted to implement the cell transistor using a vertical channel transistor (VCT) structure, in order to solve the implementation problem and reduce the size of the DRAM device. However, even if a vertical structure is employed to reduce the size of the memory device, the size reduction of the memory device is often limited by the circuits that drive the memory cell array.

SUMMARY

Some example embodiments may provide a memory core circuit and a memory device including the memory core circuit, which are capable of efficiently utilizing a core control circuit configured to drive a memory cell array.

According to some example embodiments, a memory core circuit includes: (i) a memory cell array having a plurality of sub cell arrays therein that are arranged into a matrix of a plurality of array rows and a plurality of array columns, and (ii) a core control circuit having a plurality of sub peripheral circuits therein that are arranged into a matrix of the plurality of array rows and the plurality of array columns, such that each sub peripheral circuit is disposed under each sub cell array. Each sub cell array may include a plurality of memory cells respectively connected to a plurality of wordlines and a plurality of bitlines. Each sub peripheral circuit may include: (i) a plurality of sub wordline drivers configured to drive the plurality of wordlines, (ii) a plurality of bitline sense amplifiers configured to sense voltages of the plurality of bitlines, (iii) a row decoding circuit configured to control the plurality of sub wordline drivers to select one of the plurality of wordlines, (iv) a power circuit configured to supply power to each sub peripheral circuit, and (v) a control circuit configured to control operation of each sub peripheral circuit.

According to example embodiments, a memory core circuit includes a memory cell array having a plurality of sub cell arrays therein that are arranged into a matrix of a plurality of array rows and a plurality of array columns, and a core control circuit including a plurality of sub peripheral circuits therein that are arranged into a matrix of the plurality of array rows and the plurality of array columns, with each sub peripheral circuit extending underneath a corresponding sub cell array. Each sub cell array includes a plurality of memory cells respectively connected to a plurality of wordlines and a plurality of bitlines. Each sub peripheral circuit includes a wordline driver region having a plurality of sub wordline drivers, a sense amplifier region including a plurality of bitline sense amplifiers, a decoder region including a row decoding circuit, and a power and control region including a power circuit and a control circuit.

According to additional embodiments, a memory device includes a memory core circuit, and peripheral circuits configured to control the memory core circuit. The memory core circuit includes a memory cell array including a plurality of sub cell arrays that are arranged into a matrix of a plurality of array rows and a plurality of array columns, and a core control circuit including a plurality of sub peripheral circuits that are arranged into a matrix of the plurality of array rows and the plurality of array columns, such that each sub peripheral circuit extends underneath each corresponding sub cell array. In some embodiments, each sub cell array may include a plurality of memory cells respectively connected to a plurality of wordlines and a plurality of bitlines. Each sub peripheral circuit includes a wordline driver region including a plurality of sub wordline drivers, a sense amplifier region including a plurality of bitline sense amplifiers, a decoder region including a row decoding circuit, and a power and control region including a power circuit and a control circuit.

The memory core circuit and the memory device according to example embodiments may reduce the size of the memory core circuit using the CoP structure in which the core control circuit is disposed efficiently; the design margin of the memory core circuit may also be enhanced by relieving the length limit of the bitline sense amplifiers. In addition, the operation characteristics and the performance of the memory core circuit and the memory device may be enhanced through the efficient arrangement of the voltage drivers.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
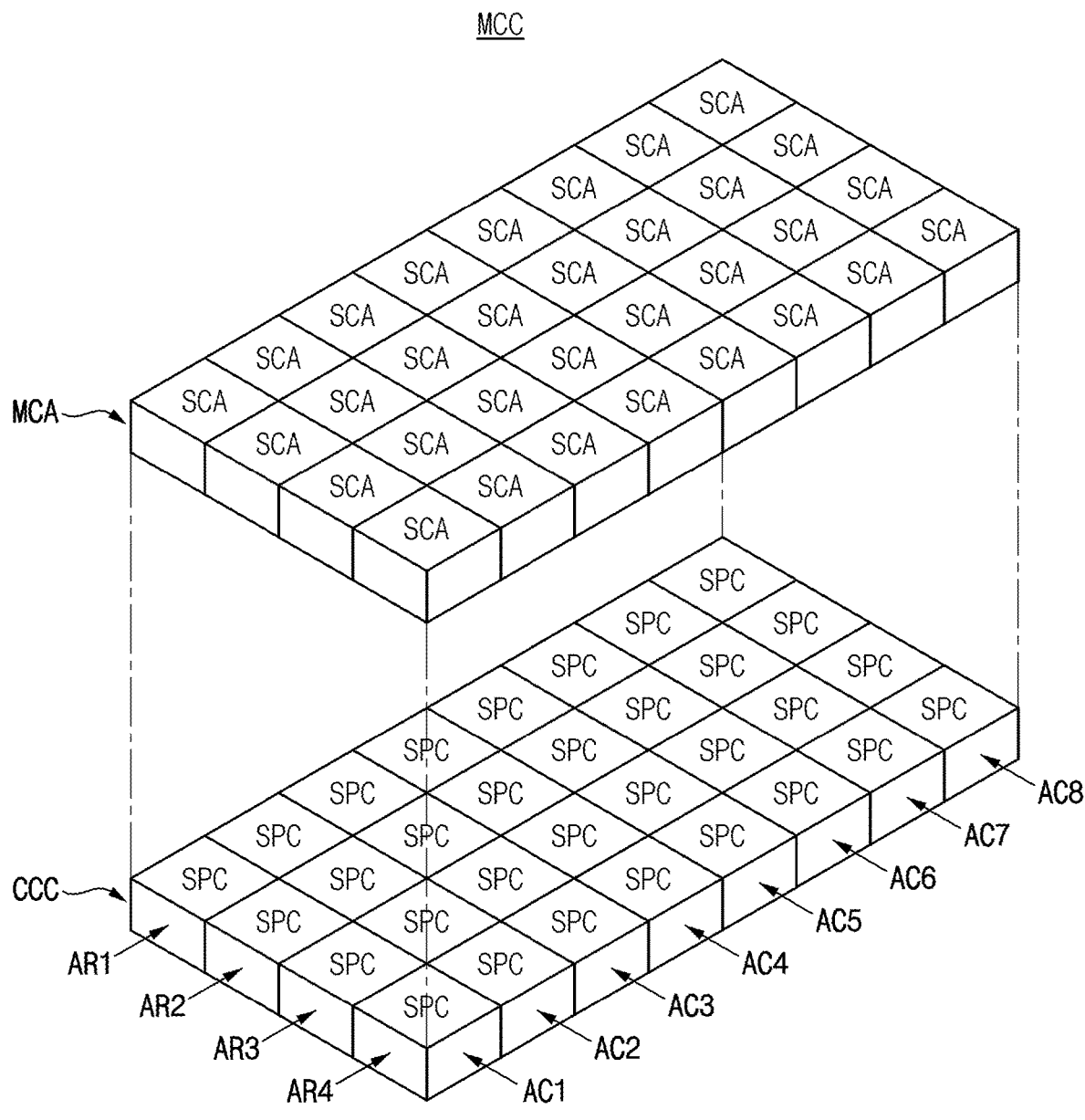
FIG. 1 is a perspective view of a memory core circuit according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
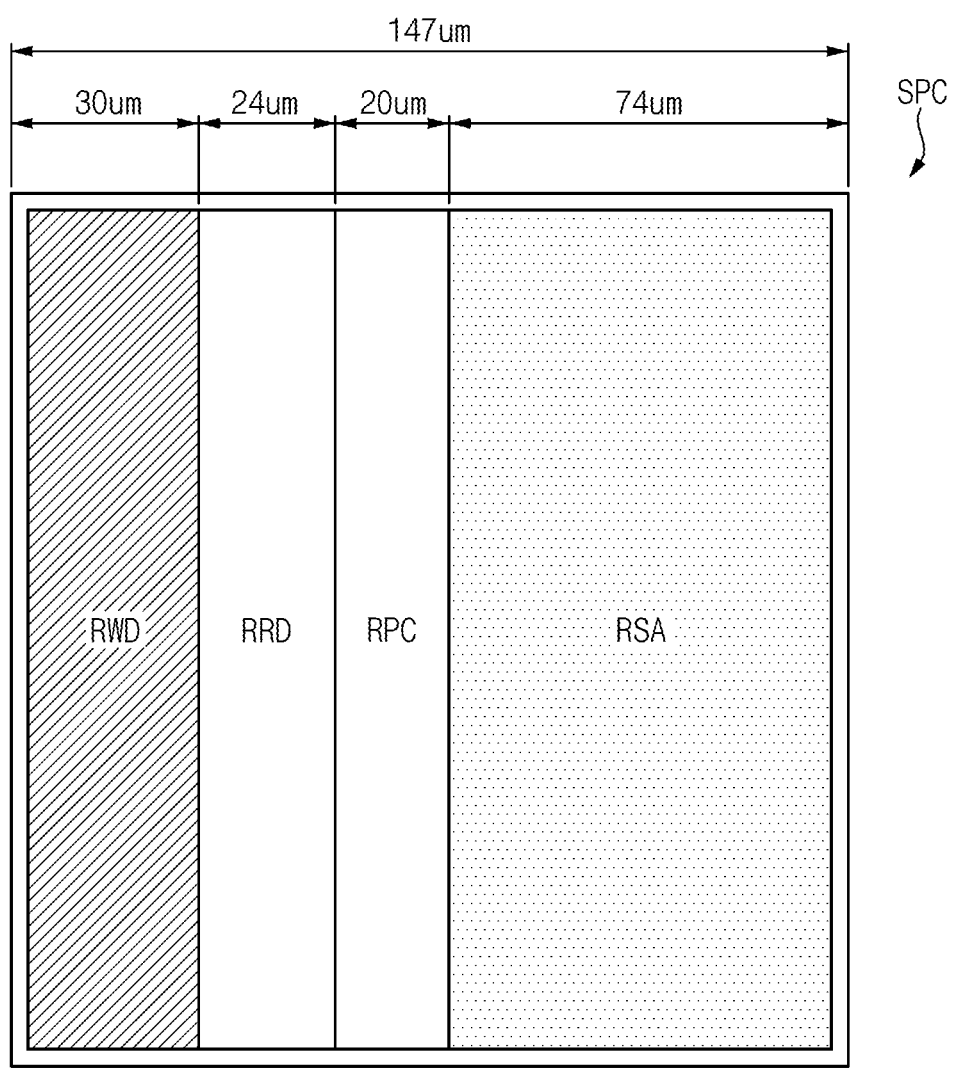
FIG. 2 is a diagram illustrating an example embodiment of a layout of a sub peripheral circuit included in a memory core circuit according to example embodiments.

FIG. 1 is a perspective view of a memory core circuit according to example embodiments, and FIG. 2 is a diagram illustrating an example embodiment of a layout of a sub peripheral circuit included in a memory core circuit according to example embodiments.

Hereinafter, a vertical direction Z indicates a direction orthogonal to an upper surface of a semiconductor substrate, and a row direction X and a column direction Y indicate two directions parallel to the upper surface of the semiconductor substrate. For example, the row direction X and the column direction Y may be perpendicular to each other. The row direction X may be referred to as a first direction or a first horizontal direction, the column direction Y may be referred to as a second direction or a second horizontal direction, and the vertical direction Z may be referred to as a third direction. The direction indicated by an arrow in figures and the opposite direction may be considered as the same direction.

Referring to FIG. 1, a memory core circuit MCC includes at least one memory cell array MCA and a core control circuit CCC. The memory core circuit MCC may have a cell on periphery (or cell over periphery) (CoP) structure such that the core control circuit CCC is disposed underneath the memory cell array MCA relative to an underlying substrate.

As shown, the memory cell array MCA may include a plurality of sub cell arrays SCA that are arranged in a matrix of a plurality of array rows AR1~AR4 and a plurality of array columns AC1~AC8. Likewise, the core control circuit CCC may include a plurality of sub peripheral circuits SPC that are arranged in a matrix of the plurality of array rows AR1~AR4 and the plurality of array columns AC1~AC8 such that each sub peripheral circuit SPC is disposed underneath a corresponding sub cell array SCA.

Each sub cell array may include a plurality of memory cells respectively connected to a plurality of wordlines and a plurality of bitlines. Each memory cell may include a vertical channel transistor and a cell capacitor disposed above the vertical channel transistor. The CoP structure using the vertical channel transistors will be described below with reference to FIGS. 6, 7 and 8.

Each sub peripheral circuit may include, as will be described more fully below, a plurality of sub wordline drivers configured to drive the plurality of wordlines, a plurality of bitline sense amplifiers configured to sense voltages of the plurality of bitlines, a row decoding circuit configured to control the plurality of sub wordline drivers to select one of the plurality of wordlines, a power circuit configured to supply power to each sub peripheral circuit, and a control circuit configured to control operation of each sub peripheral circuit. FIG. 1 illustrates the thirty two sub cell arrays SCA and the thirty to sub peripheral circuits SPC corresponding to the four array rows AR1~AR4 and the eight array columns AC1~AC8 for convenience of illustration, and example embodiments are not limited to the particular number of the sub cell arrays SCA and the sub peripheral circuits SPC.

FIG. 2 illustrates a layout of one sub peripheral circuit SPC, and the respective sub peripheral circuits SPC included in the memory core circuit MCC of FIG. 1 may have the same layout as illustrated in FIG. 2. Referring to FIG. 2, Each sub peripheral circuit SPC may include a wordline driver region RWD including the plurality of sub wordline drivers, a sense amplifier region RSA including the plurality of bitline sense amplifiers, a decoder region RRD including the row decoding circuit, and a power and control region RPC including the power circuit and the control circuit.

As illustrated in FIG. 2, the wordline driver region RWD, the sense amplifier region RSA, the decoder region RRD and the power and control region RPC are arranged in a row direction X. In some example embodiments, the wordline driver region RWD and the sense amplifier region RSA may be disposed at both ends in the row direction X of each sub peripheral circuit SPC. The decoder region RRD may be disposed adjacent in the row direction X to the wordline driver region RWD between the wordline driver region RWD and the sense amplifier region RSA. The power and control region RPC may be disposed adjacent in the row direction X to the sense amplifier region RSA between the wordline driver region RWD and the sense amplifier region RSA.

FIG. 2 further illustrates exemplary sizes, in a row direction, of elements within each sub peripheral circuit SPC. For example, an entire row size of each sub peripheral circuit SPC may be about 147 μm, a row size of the sense amplifier region RSA may be about 74 μm, a row size of the wordline driver region RWD may be about 30 µm, a row size of the decoder region RRD may be about 24 µm, and a row size of the power and control region RPC may be about 20 µm. As such, the area of the sense amplifier region RSA may be half the area of each sub peripheral circuit SPC. Example embodiments are not limited to the specific sizes illustrated in FIG. 2.

Figure 3:
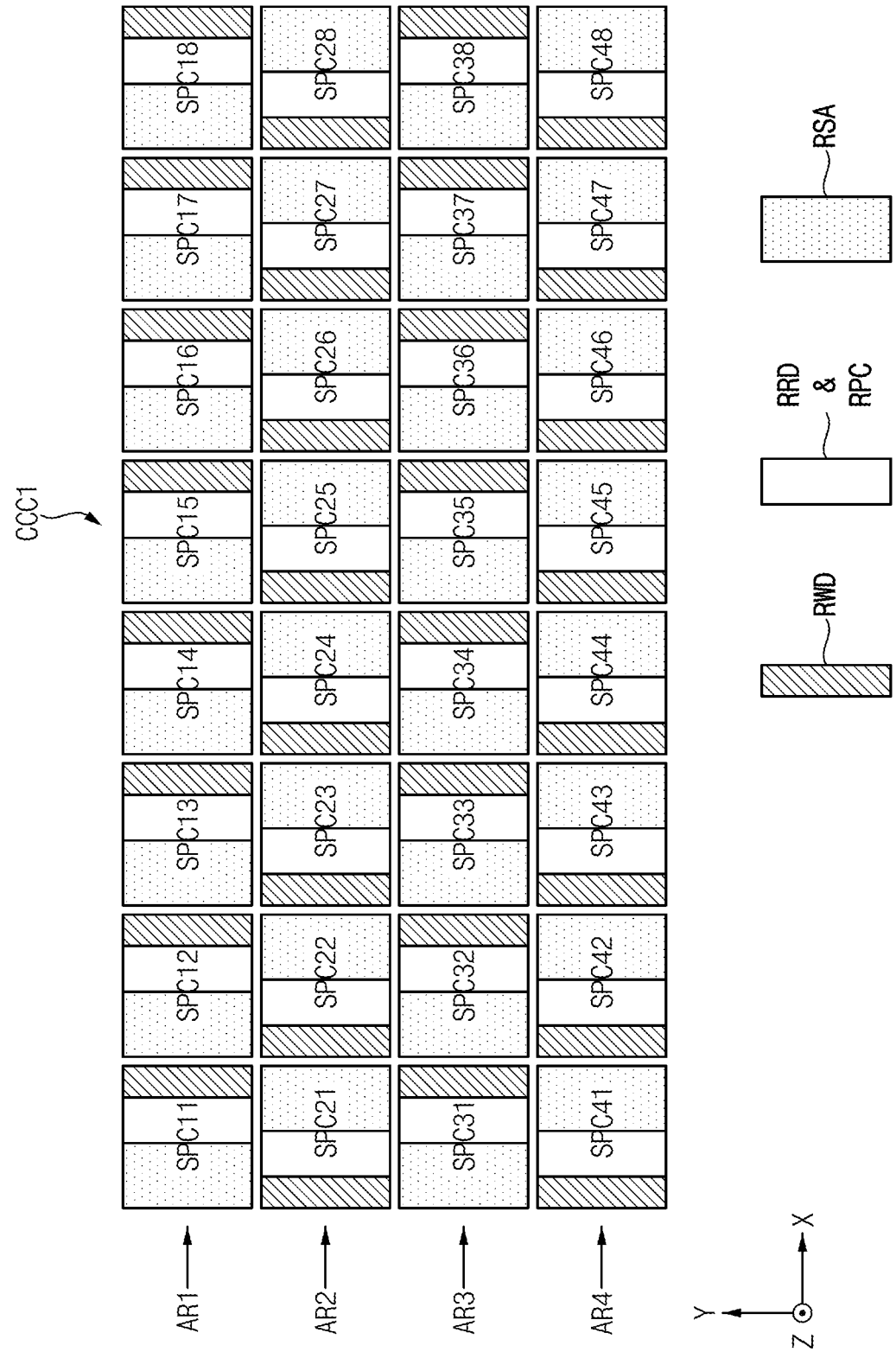
FIGS. 3 and 4 are diagrams illustrating example embodiments of a layout of a core control circuit included in a memory core circuit according to example embodiments.
Figure 4:
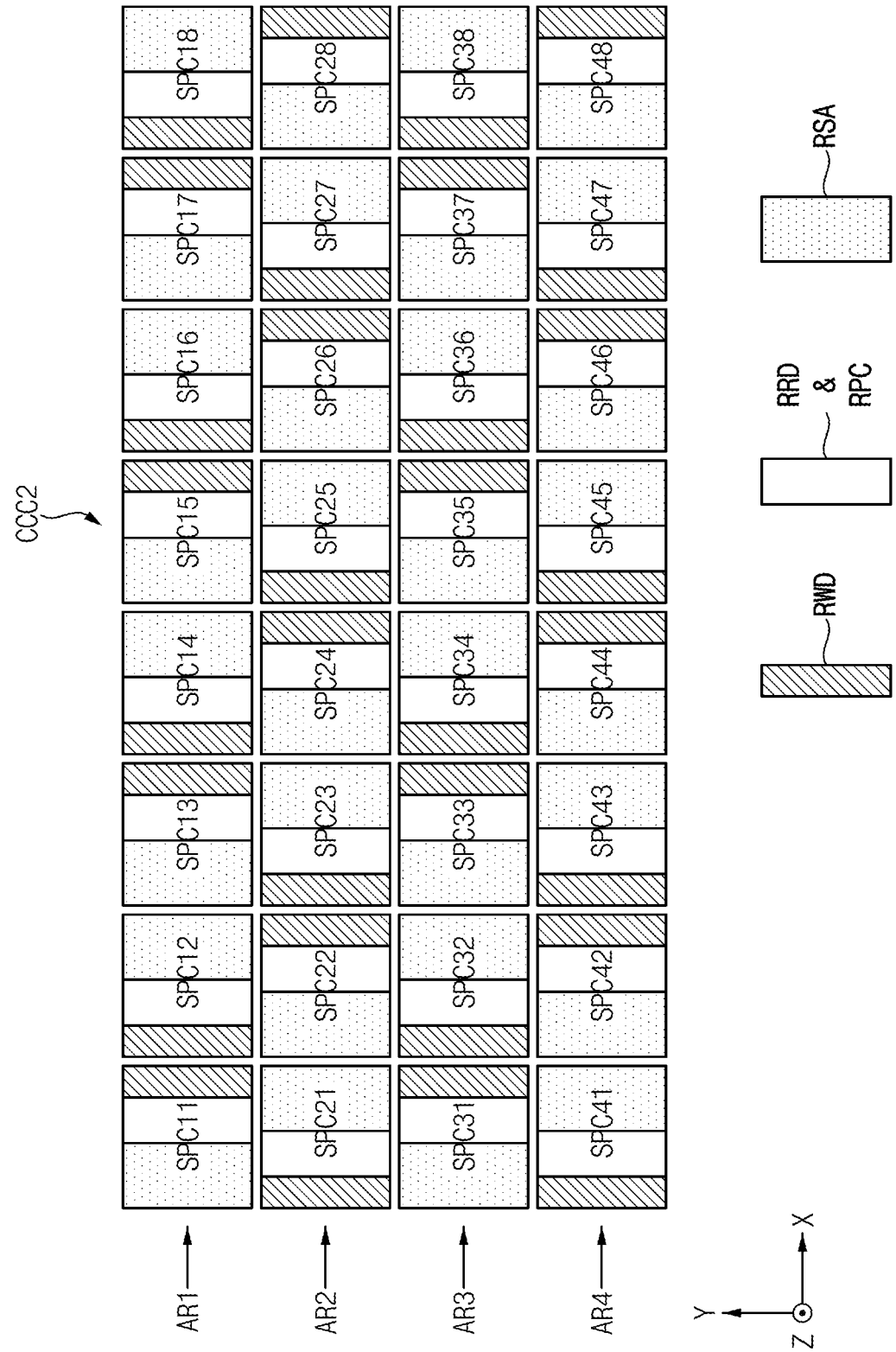

FIGS. 3 and 4 are diagrams illustrating example embodiments of a layout of a core control circuit included in a memory core circuit according to example embodiments. Referring to FIG. 3, a core control circuit CCC1 may include a plurality of sub peripheral circuits SPC11~SPC48 that are arranged in a matrix layout including the plurality of array rows AR1~AR4 and the plurality of array columns AC1~AC8. In some example embodiments, the core control circuit CCC1 may have a shift structure such that, with respect to a first sub peripheral circuit and a second sub peripheral circuit that are adjacent in the row direction X, the wordline driver region RWD of the first sub peripheral circuit may be adjacent in the row direction X to the sense amplifier region RSA of the second sub peripheral circuit.

For example, with respect to the two sub peripheral circuits SPC13 and SPC14 adjacent in the row direction X in the first array row AR1, the wordline driver region RWD of the sub peripheral circuit SPC13 may be adjacent in the row direction X to the sense amplifier region RSA of the sub peripheral circuit SPC14. In the same way, with respect to the two sub peripheral circuits SPC25 and SPC26 adjacent in the row direction X in the second array row AR2, the wordline driver region RWD of the sub peripheral circuit SPC26 may be adjacent in the row direction X to the sense amplifier region RSA of the sub peripheral circuit SPC25.

In some example embodiments, with respect to a third sub peripheral circuit and a fourth sub peripheral circuit that are adjacent in the column direction Y, the sense amplifier region RSA of the third sub peripheral circuit may be adjacent in the column direction Y to the wordline driver region RWD of the fourth sub peripheral circuit. For example, with respect to the two sub peripheral circuits SPC13 and SPC23 that are adjacent in the column direction Y, the sense amplifier region RSA of the sub peripheral circuit SPC13 may be adjacent in the column direction Y to the wordline driver region RWD of the sub peripheral circuit SPC23; and, the sense amplifier region RSA of the sub peripheral circuit SPC23 may be adjacent in the column direction Y to the wordline driver region RWD of the sub peripheral circuit SPC13. In the same way, with respect to the two sub peripheral circuits SPC25 and SPC35 that are adjacent in the column direction Y, the sense amplifier region RSA of the sub peripheral circuit SPC25 may be adjacent in the column direction Y to the wordline driver region RWD of the sub peripheral circuit SPC35.

Alternatively, as shown by FIG. 4, a core control circuit CCC2 may include a plurality of sub peripheral circuits SPC11~SPC48 that are arranged in a matrix of the plurality of array rows AR1~AR4 and the plurality of array columns AC1~AC8. In some example embodiments, the memory core circuit MCC2 may have a mirror structure such that, with respect to a first sub peripheral circuit and a second sub peripheral circuit that are adjacent in a row direction, the wordline driver region RWD of the first sub peripheral circuit may be adjacent in the row direction X to the wordline driver region RWD of the second sub peripheral circuit, or the sense amplifier region RSA of the first sub peripheral circuit may be adjacent in the row direction X to the sense amplifier region RSA of the second sub peripheral circuit.

For example, with respect to the two sub peripheral circuits SPC14 and SPC15 that are adjacent in the row direction X, the two sense amplifier regions RSA respectively included in the two sub peripheral circuits SPC14 and SPC15 may be adjacent to each other, and may face each other. In contrast, with respect to the two sub peripheral circuits SPC24 and SPC25 that are adjacent in the row direction X, the two wordline driver regions RWD respectively included in the two sub peripheral circuits SPC24 and SPC25 may be adjacent to each other.

Figure 5:
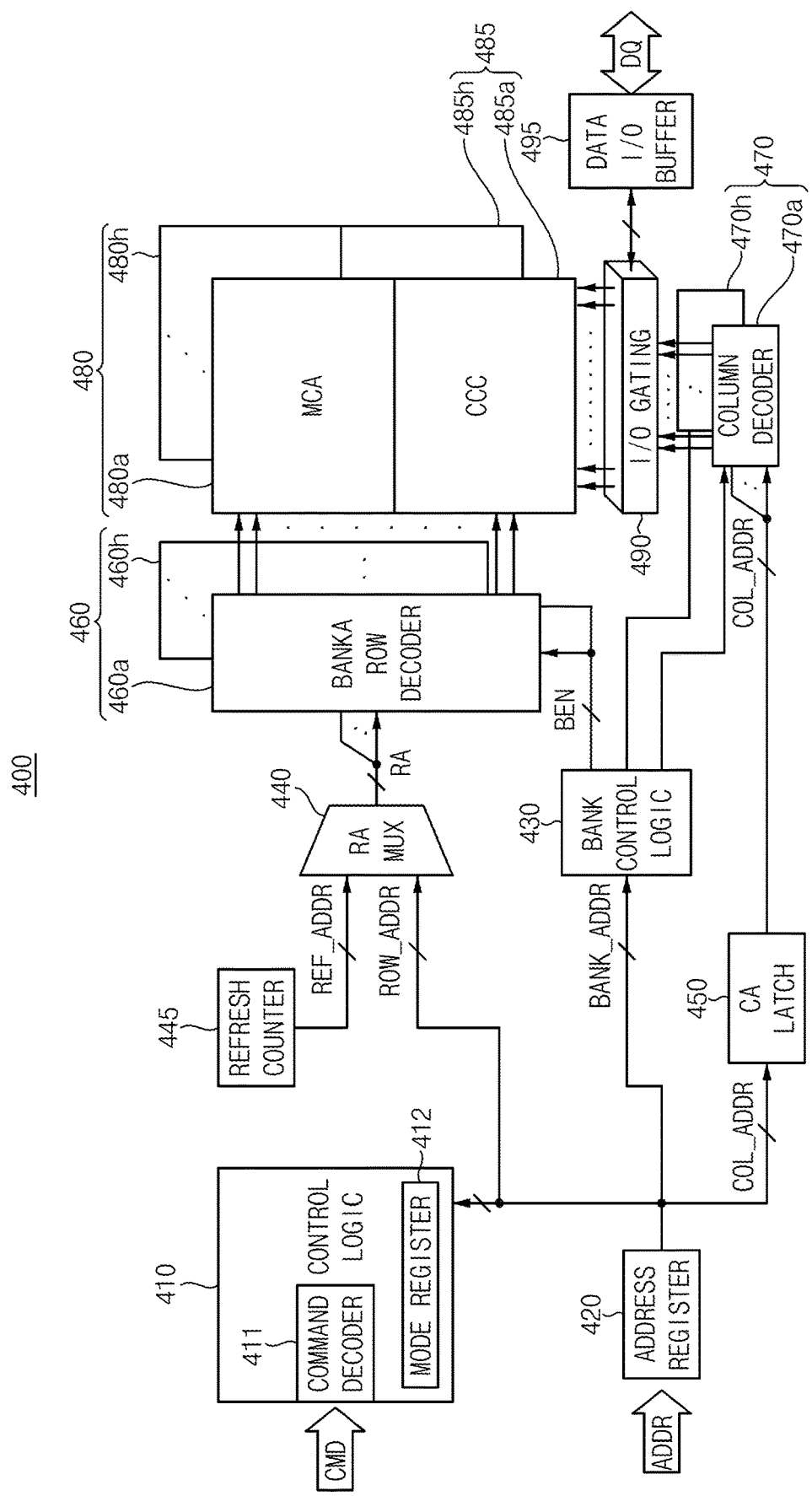
FIG. 5 is a block diagram illustrating a memory device according to example embodiments.

Referring now to FIG. 5, a block diagram of a memory device 400 according to example embodiments is illustrated as including control logic 410, an address register 420, a bank control logic 430, a row address multiplexer 440, a column address latch 450, a row decoder 460, a column decoder 470, a memory cell array MCA 480, a core control circuit CCC 485, an input-output (I/O) gating circuit 490, a data input-output (I/O) buffer 495, and a refresh counter 445.

The memory cell array 480 may include a plurality of bank arrays 480a~480h. The row decoder 460 may include a plurality of bank row decoders 460a~460h respectively coupled to the bank arrays 480a~480h, the column decoder 470 may include a plurality of bank column decoders 470a~470h respectively coupled to the bank arrays 480a~480h, and the core control circuit 485 may include a plurality of bank core control circuits 485a~485h respectively coupled to the bank arrays 480a~480h. The plurality of bank arrays 480a~480h and the plurality of bank core control circuits 485a~485h may be stacked in a vertical direction to form a CoP structure.

The address register 420 may receive an address ADDR including a bank address BANK_ADDR, a row address ROW_ADDR and a column address COL_ADDR from a memory controller (not shown). The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. The bank control signals may include bank enable signals BEN to activate a selection memory bank corresponding to the bank address BANK_ADDR. One of the bank row decoders 460a~460h corresponding to the bank address BANK_ADDR may be activated in response to the bank control signals, and one of the bank column decoders 470a~470h corresponding to the bank address BANK_ADDR may be activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 may be applied to the bank row decoders 460a~460h.

The activated one of the bank row decoders 460a~460h may decode the row address RA that is output from the row address multiplexer 440, and may activate a word-line corresponding to the row address RA. For example, the activated bank row decoder may apply a word-line driving voltage to the word-line corresponding to the row address RA.

The column address latch 450 may receive the column address COL_ADDR from the address register 420, and may temporarily store the received column address COL_ADDR. In some embodiments, in a burst mode, the column address latch 450 may generate column addresses that increment from the received column address COL_ADDR. The column address latch 450 may apply the temporarily stored or generated column address to the bank column decoders 470a~470h. The activated one of the bank column decoders 470a~470h may decode the column address COL_ADDR that is output from the column address latch 450, and may control the input-output I/O gating circuit 490 in order to output data corresponding to the column address COL_ADDR.

The I/O gating circuit 490 may include a circuitry for gating input/output data. The I/O gating circuit 490 may further include read data latches for storing data that is output from the bank arrays 480a~480h, and write drivers for writing data to the bank arrays 480a~480h. Data to be read from one bank array of the bank arrays 480a~480h may be sensed by the sense amplifier unit 485 coupled to the one bank array from which the data is to be read, and may be stored in the read data latches. The data stored in the read data latches may be provided to the memory controller via the data I/O buffer 495. Data DQ to be written in one bank array of the bank arrays 480a~480h may be provided to the data I/O buffer 495 from the memory controller. The write driver may write the data DQ in one bank array of the bank arrays 480a~480h.

The control logic 410 may control operations of the memory device 400. For example, the control logic 410 may generate control signals for the memory device 400 in order to perform a write operation or a read operation. The control logic 410 may include a command decoder 411 that decodes a command CMD received from the memory controller and a mode register set 412 that sets an operation mode of the memory device 400. For example, the command decoder 411 may generate the control signals corresponding to the command CMD by decoding a write enable signal, a row address strobe signal, a column address strobe signal, a chip selection signal, etc.

Figure 6:
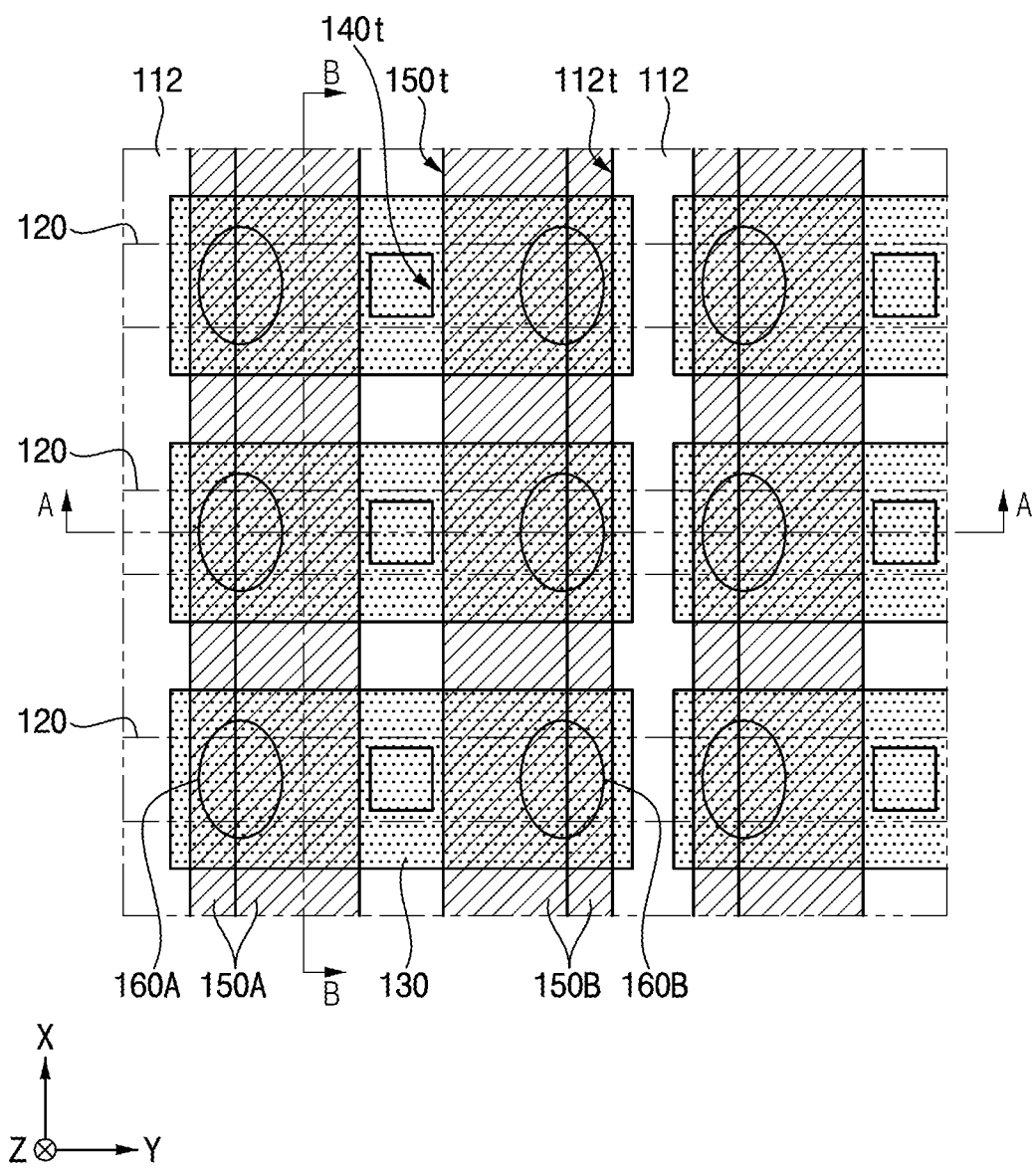
FIG. 6 is a diagram illustrating a schematic layout of a memory core circuit according to example embodiments.
Figure 7:
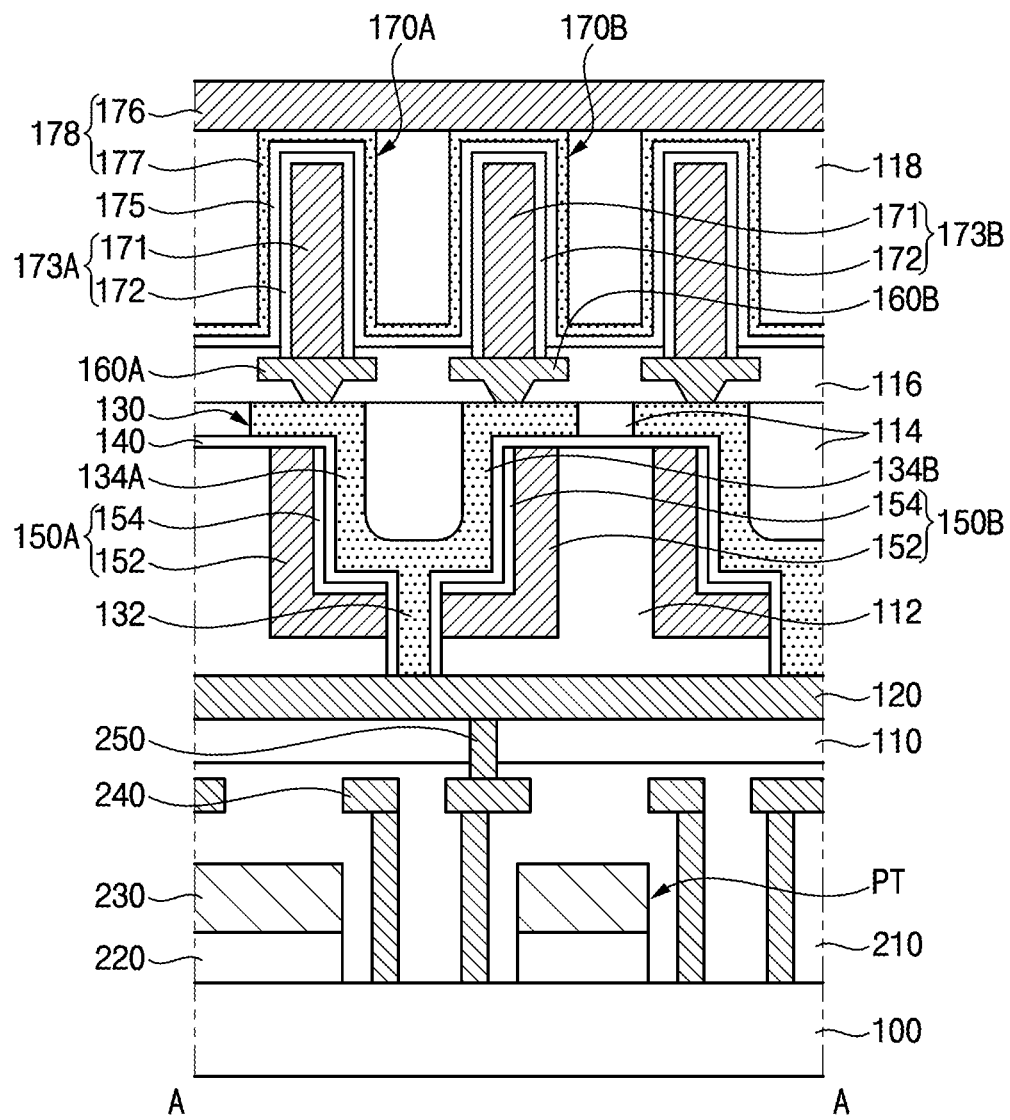
FIG. 7 is a cross-sectional view taken along a line A-A in FIG. 6.

FIG. 6 is a diagram illustrating a schematic layout of a memory core circuit according to example embodiments. FIG. 7 is a cross-sectional view taken along a line A-A in FIG. 6, and FIG. 8 is a cross-sectional view taken along a line B-B in FIG. 6.

Figure 8:
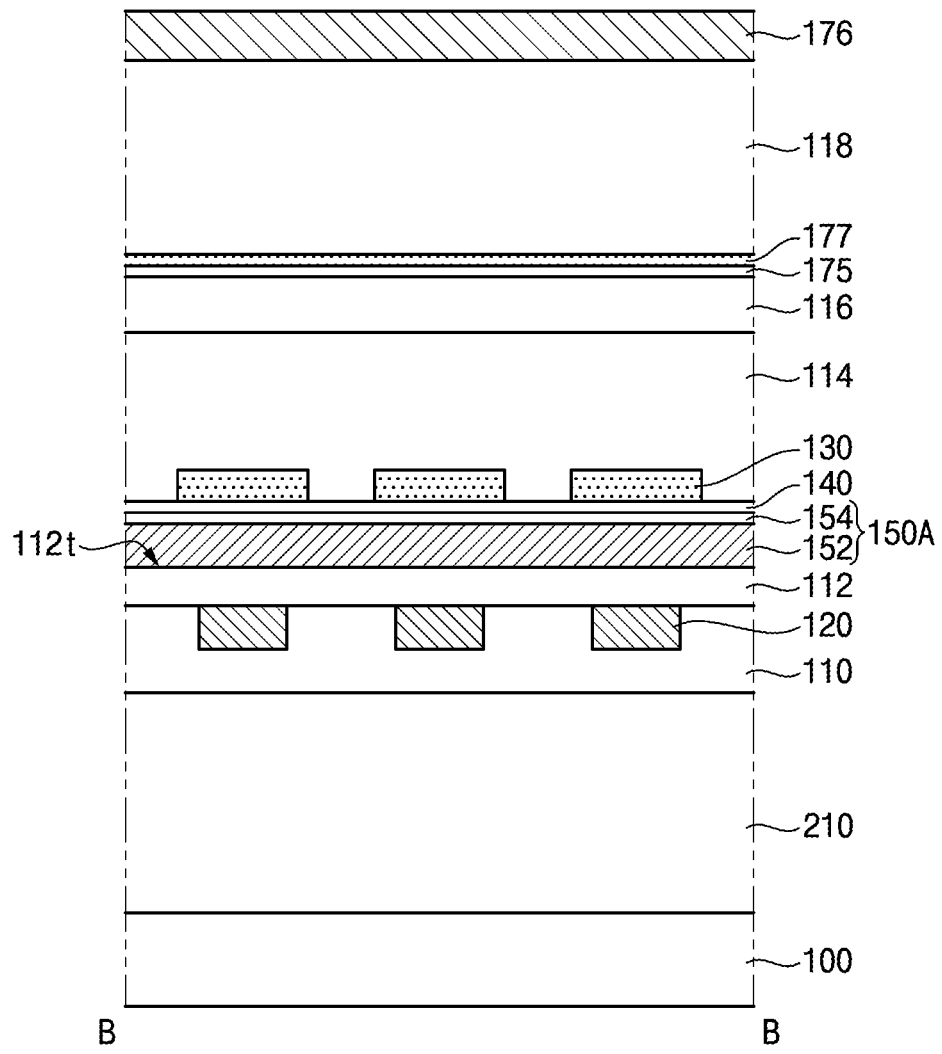
FIG. 8 is a cross-sectional view taken along a line B-B in FIG. 6.

Referring to FIGS. 6, 7 and 8, the memory device according to some embodiments includes a first substrate 100, a conductive line 120, a first interlayer insulation film 112, gate electrodes 150A and 150B, a gate insulation layer 140, a channel layer 130, a second interlayer insulation film 114, landing pads 160A and 160B, and capacitor structures 170A and 170B. Although the first substrate 100 may have a structure in which a base substrate and an epitaxial layer are stacked, the present disclosure is not limited thereto. The first substrate 100 may be a silicon substrate, a gallium arsenide substrate, a silicon germanium substrate, or an SOI (Semiconductor On Insulator) substrate.

The conductive line 120 may be formed on the first substrate 100. For example, a lower insulation film 110 may be formed on the first substrate 100, and the conductive line 120 may be placed on the lower insulation film 110. The conductive line 120 may extend lengthwise in the column direction Y. The plurality of conductive lines 120 each extend in the column direction Y and may be spaced apart from each other at equal intervals in the row direction X that intersects the column direction Y. The lower insulation film 110 may be formed in (e.g., to fill) a space between the conductive lines 120. In some embodiments, an upper surface of the lower insulation film 110 may be placed at the same level as an upper surface of the conductive line 120. The conductive line 120 may function as a bit line of the semiconductor memory device according to some embodiments.

The conductive line 120 may include doped polysilicon, metal, conductive metal nitride, conductive metal silicide, conductive metal oxide, or combinations thereof. For example, the conductive line 120 may include, but is not limited to, doped polysilicon, aluminum (Al), copper (Cu), titanium (Ti), tantalum (Ta), ruthenium (Ru), tungsten (W), molybdenum (Mo), platinum (Pt), nickel (Ni), cobalt (Co), titanium nitride (TiN), tantalum nitride (TaN), tungsten nitride (WN), niobium nitride (NbN), titanium aluminide (TiAl), titanium aluminum nitride (TiAlN), titanium silicide (TiSi), titanium silicon nitride (TiSiN), tantalum silicide (TaSi), tantalum silicon nitride (TaSiN), ruthenium titanium nitride (RuTiN), nickel silicide (NiSi), cobalt silicide (CoSi), iridium oxide (IrOx), ruthenium oxide (RuOx) or combinations thereof. Alternatively, the conductive line 120 may include a two-dimensional semiconductor material. The two-dimensional semiconductor material may include, for example, graphene, carbon nanotube, or a combination thereof. The conductive line 120 may include a single layer or multiple layers of the conductive materials described above.

The first interlayer insulation film 112 may be formed on the first substrate 100. The first interlayer insulation film 112 may include (e.g., define) a cell trench 112t that extends lengthwise in the row direction X and crosses the conductive line 120. The plurality of cell trenches 112t each extend in the row direction X and may be spaced apart from each other at equal intervals in the column direction Y. Therefore, each of the first interlayer insulation films 112 may form pin-shaped insulating patterns that extend in the row direction X and are spaced apart from each other by the cell trench 112t.

In some embodiments, the first interlayer insulation film 112 may be placed on the upper surface of the lower insulation film 110 to cover the conductive line 120. In some embodiments, a lower portion/surface of the cell trench 112t may be spaced apart from the upper surface of the conductive line 120. In some embodiments, a width of the cell trench 112t may decrease toward the upper surface of the first substrate 100. Here, the width of the cell trench 112t means a width in the column direction Y. This decrease in width may be due to the characteristics of an etching process for forming the cell trench 112t.

The first interlayer insulation film 112 may include, for example, but is not limited to, at least one of silicon oxide, silicon oxynitride, silicon nitride, and a low dielectric constant (low-k) material having a lower dielectric constant than silicon oxide. The gate electrodes 150A and 150B may be formed in the cell trench 112t. For example, the gate electrodes 150A and 150B may extend along the lower surface and the side surfaces of the cell trench 112t. Also, the gate electrodes 150A and 150B may each extend lengthwise in the row direction X and cross the conductive line 120.

In some embodiments, the gate electrodes 150A and 150B may include a first gate electrode 150A and a second gate electrode 150B that are spaced apart from each other in the column direction Y. The first gate electrode 150A and the second gate electrode 150B may face each other in the cell trench 112t. For example, the first gate electrode 150A may extend along the lower surface and a first side surface of the cell trench 112t, and the second gate electrode 150B may extend along the lower surface of the cell trench 112t and a second side surface thereof facing the first side surface. As an example, in a cross section intersecting the row direction X (e.g., in FIG. 7), the gate electrodes 150A and 150B may each have an "L" shape. The first gate electrode 150A may function as a first word line of the semiconductor memory device according to some embodiments, and the second gate electrode 150B may function as a second word line of the semiconductor memory device according to some embodiments.

In some embodiments, a separation trench 150t may be formed in the first interlayer insulation film 112 and the gate electrodes 150A and 150B. The separation trench 150t may extend in the row direction X to separate the first gate electrode 150A and the second gate electrode 150B. Further, the separation trench 150t may overlap (e.g., expose) a part of the conductive line 120. For example, a lower portion/surface of the separation trench 150t may overlap/expose a part of the upper surface of the conductive line 120.

The gate electrodes 150A and 150B may each include doped polysilicon, metal, conductive metal nitride, conductive metal silicide, conductive metal oxide, or a combination thereof. For example, the gate electrodes 150A and 150B may include, but are not limited to, doped polysilicon, Al, Cu, Ti, Ta, Ru, W, Mo, Pt, Ni, Co, TiN, TaN, WN, NbN, TiAl, TiAlN, TiSi, TiSiN, TaSi, TaSiN, RuTiN, NiSi, CoSi, IrOx, RuOx or combinations thereof.

In some embodiments, the first gate electrode 150A and the second gate electrode 150B may each include a first conductive pattern 152 and a first barrier conductive film 154. The first conductive pattern 152 and the first barrier conductive film 154 may be sequentially stacked in the cell trench 112t. For example, the first conductive pattern 152 may conformally extend along the lower surface and the side surfaces of the cell trench 112t. The first barrier conductive film 154 may conformally extend along the profile of the first conductive pattern 152. The first barrier conductive film 154 may be interposed between the first conductive pattern 152 and a gate insulation layer 140 to be described below.

The first barrier conductive film 154 may reduce/prevent diffusion of the elements included in the first conductive pattern 152. As an example, the first conductive pattern 152 may include at least one of tungsten (W), aluminum (Al), and copper (Cu), and the first barrier conductive film 154 may include at least one of titanium (Ti), titanium nitride (TiN), tantalum (Ta), and tantalum nitride (TaN).

The gate insulation layer 140 may be stacked on the gate electrodes 150A and 150B. For example, the gate insulation layer 140 may conformally extend along the profile of the gate electrodes 150A and 150B. The gate insulation layer 140 may be interposed between the gate electrodes 150A and 150B and a channel layer 130 to be described below. In some embodiments, the gate insulation layer 140 may further extend along the upper surface of the first interlayer insulation film 112. In some embodiments, the gate insulation layer 140 may extend along the side surfaces of the separation trench 150t.

In some embodiments, the gate insulation layer 140 may have a gap/opening therein that overlaps (e.g., exposes) a part of the conductive line 120. For example, the gate insulation layer 140 may include a contact trench 140t inside the separation trench 150t. The lower portion/surface of the contact trench 140t may overlap/expose a part of the upper surface of the conductive line 120. Although FIG. 6 shows that the contact trench 140t has a rectangular shape, this is only an example. As another example, the contact trench 140t may have a circular or other polygonal shape. Also, although FIG. 6 shows that one contact trench 140t overlaps/exposes one conductive line 120, this is also only an example. As another example, one contact trench 140t may extend lengthwise in the row direction X to overlap/expose the plurality of conductive lines 120.

The gate insulation layer 140 may include silicon oxide, silicon oxynitride, a high dielectric constant material having a higher dielectric constant than silicon oxide, or a combination thereof. The high dielectric constant material may include, but is not limited to, for example, hafnium oxide (HfO2), hafnium silicon oxide (HfSiO), hafnium silicon oxynitride (HfSiON), hafnium tantalum oxide (HfTaO), hafnium titanium oxide (HfTiO), hafnium zirconium oxide (HfZrO), zirconium oxide (ZrO2), aluminum oxide (Al2O3), or a combination thereof.

In some embodiments, the gate insulation layer 140 may provide the semiconductor memory device according to some embodiments as a ferroelectric memory element (ferroelectric RAM, FeRAM). As an example, the gate insulation layer 140 may include ferroelectrics such as barium titanate (BaTiO3), lead zirconate titanate (PbZrTiO3, PZT), strontium bismuth tantalate (STB; SrBi2Ta2O9), bismuth iron oxide (BiFeO3, BFO), and hafnium oxide (HfO2).

The channel layer 130 may be stacked on (e.g., on an upper surface of) the gate insulation layer 140. The channel layer 130 may be inside (e.g., may fill at least a part of) the cell trench 112t. For example, the channel layer 130 may extend along the profiles of the gate electrodes 150A and 150B and the gate insulation layer 140. Therefore, each of the gate electrodes 150A and 150B and the gate insulation layer 140 may be interposed between the first interlayer insulation film 112 and the channel layer 130.

The channel layer 130 may be connected to the conductive line 120. In some embodiments, the channel layer 130 may be electrically connected to the upper surface of the conductive line 120 by extending through the separation trench 150t and the contact trench 140t. As shown in FIG. 6, the plurality of channel layers 130 are spaced apart from each other in the column direction Y and the row direction X, and may be arranged in a matrix form.

In the semiconductor memory device according to some embodiments, the channel layer 130 may include a first source/drain region and a second source/drain region that are arranged along the vertical direction Z that intersects the column direction Y and the row direction X. For example, the lower part of the channel layer 130 may function as a first source/drain region, and the upper part of the channel layer 130 may function as a second source/drain region. A part of the channel layer 130 between the first source/drain region and the second source/drain region may function as a channel region.

The channel layer 130 may include a semiconductor material. As an example, the channel layer 130 may include an oxide semiconductor material. The oxide semiconductor material may reduce a leakage current of the semiconductor memory device. The oxide semiconductor material may include, for example, IGZO (indium gallium zinc oxide, InxGayZnzO), IGSO (indium gallium silicon oxide, InxGaySizO), ITZO (indium tin zinc oxide, InxSnyZnzO), IZO (indium zinc oxide, InxZnyO), ZnO (zinc oxide, ZnxO), ZTO (zinc tin oxide, ZnxSnyO), ZnON (zinc oxynitride, ZnxOyN), ZZTO (zirconium zinc tin oxide, ZrxZnySnzO), SnO (tin oxide, SnxO), HIZO (hafnium indium zinc oxide, HfxInyZnzO), GZTO (gallium zinc tin oxide, GaxZnySnzO), AZTO (aluminum zinc tin oxide, AlxZnySnzO), YGZO (ytterbium gallium zinc oxide, YbxGayZnzO), IGO (indium gallium oxide, InxGayO) or a combination thereof.

As another example, the channel layer 130 may include silicon (Si) and germanium (Ge) as elemental semiconductor materials, or materials doped to them. Alternatively, the channel layer 130 may also include a group IV-IV compound semiconductor or a group III-V compound semiconductor. The group IV-IV compound semiconductor may be, for example, a binary compound or a ternary compound including at least two or more of carbon (C), silicon (Si), germanium (Ge), and tin (Sn), or a compound obtained by doping these elements with a group IV element.

As another example, the channel layer 130 may include a two-dimensional semiconductor material. The two-dimensional semiconductor material may include, for example, graphene, carbon nanotube, transition metal dichalcogenide (TMD), or a combination thereof. The TMD may include, for example, one metal element among Mo, W, Nb, vanadium (V), Ta, Ti, Zr, Hf, technetium (Tc), rhenium (Re), Cu, Ga, In, Sn, Ge and Pb, and one chalcogen element among sulfur (S), selenium (Se), and tellurium (Te).

According to some embodiments, the channel layer 130 may include a single layer or multiple layers of the semiconductor materials described above. Preferably, the channel layer 130 may include IGZO. And, in other embodiments, the channel layer 130 may have a bandgap energy that is greater than a bandgap energy of silicon (Si). For example, the channel layer 130 may have a bandgap energy of about 1.5 electron volts (eV) to 5.6 eV. Preferably, the channel layer 130 may have a bandgap energy of about 2.0 eV to 4.0 eV. The channel layer 130 may be, but is not limited to, for example, polycrystalline or amorphous.

As shown, the channel layer 130 may be a continuous layer that includes each of a penetration portion 132, a first extension portion 134A, and a second extension portion 134B. The penetration portion 132 may be interposed between the first gate electrode 150A and the second gate electrode 150B. The penetration portion 132 may penetrate the first interlayer insulation film 112 and be connected (e.g., electrically connected) to the conductive line 120. For example, the penetration portion 132 may be inside (e.g., may fill) the contact trench 140t. The first extension portion 134A may extend from the penetration portion 132 along the side surfaces of the first gate electrode 150A. The second extension portion 134B may extend from the penetration portion 132 along the side surfaces of the second gate electrode 150B.

In the semiconductor memory device according to some embodiments, the first extension portion 134A may function as a first channel region of a first transistor including the first gate electrode 150A, and the second extension portion 134B may function as a second channel region of a second transistor including the second gate electrode 150B. Accordingly, two transistor structures may be provided for each channel layer 130.

In some embodiments, the first extension portion 134A and the second extension portion 134B may face (e.g., may be opposite, in parallel with) each other inside the cell trench 112t. As an example, in a cross section intersecting the row direction X (e.g., in FIG. 7), the first extension portion 134A and the second extension portion 134B may collectively have a "U" shape.

In some embodiments, a part of the first extension portion 134A and a part of the second extension portion 134B may be placed on the upper surface of the first interlayer insulation film 112. For example, the first extension portion 134A may further extend along the upper surface of the first gate electrode 150A, and the second extension portion 134B may further extend along the upper surface of the second gate electrode 150B.

The second interlayer insulation film 114 may be formed on the channel layer 130. For example, the second interlayer insulation film 114 may be formed on the gate insulation layer 140. The second interlayer insulation film 114 may separate a plurality of channel layers 130 that are spaced apart from each other and arranged in a matrix form. In some embodiments, the upper surface of the second interlayer insulation film 114 may be placed at the same level as the upper surface of the channel layer 130. That is, the second interlayer insulation film 114 may be on (e.g., may cover) the side surfaces of the channel layer 130. In some embodiments, the second interlayer insulation film 114 may be interposed between the first extension portion 134A and the second extension portion 134B. For example, the second interlayer insulation film 114 may be formed on the channel layer 130 to fill the cell trench 112t. This second interlayer insulation film 114 may include, but is not limited to, for example, at least one of silicon oxide, silicon oxynitride, silicon nitride, and a low dielectric constant (low-k) material having a lower dielectric constant than silicon oxide.

Landing pads 160A and 160B may be formed on the first interlayer insulation film 112 and the second interlayer insulation film 114. Each of the landing pads 160A and 160B may be electrically connected to the channel layer 130. For example, a third interlayer insulation film 116 may be formed on the first interlayer insulation film 112 and the second interlayer insulation film 114. The landing pads 160A and 160B are each formed in the third interlayer insulation film 116 and may be electrically connected to the upper part of the channel layer 130.

In some embodiments, each of the landing pads 160A and 160B may be placed to overlap at least a part of the channel layer 130 in the vertical direction Z. A plurality of landing pads 160A and 160B are spaced apart from each other in the column direction Y and the row direction X, and may be arranged in a matrix form. However, this is only an example, and the placement of the landing pads 160A and 160B is not limited, as long as the landing pads are electrically connected to the channel layer 130. As another example, the plurality of landing pads 160A and 160B may also be arranged in a honeycomb form.

In some embodiments, the landing pads 160A and 160B may include a first landing pad 160A and a second landing pad 160B that are spaced from each other in the column direction Y. The first landing pad 160A may be in contact with one end (e.g., a first end) of the channel layer 130 adjacent to the first gate electrode 150A, and the second landing pad 160B may be in contact with the other end (e.g., a second end that is opposite the first end) of the channel layer 130 adjacent to the second gate electrode 150B. For example, the first landing pad 160A may be in contact with the first extension portion 134A, and the second landing pad 160B may be in contact with the second extension portion 134B.

In some embodiments, the first landing pad 160A may be in contact with the upper surface of the first extension portion 134A that extends along the upper surface of the first gate electrode 150A, and the second landing pad 160B may be in contact with the upper surface of the second extension portion 134B that extends along the upper surface of the second gate electrode 150B.

Although the drawings show that the first landing pad 160A overlaps the first gate electrode 150A in the vertical direction Z, and the second landing pad 160B overlaps the second gate electrodes 150B in the vertical direction Z, this is only an example. As long as each of the first landing pad 160A and the second landing pad 160B is electrically connected to the channel layer 130, the placement of the first landing pad 160A and the second landing pad 160B may vary. In some embodiments, the landing pads 160A and 160B may each include doped polysilicon, metal, conductive metal nitride, conductive metal silicide, conductive metal oxide, or a combination thereof. For example, the landing pads 160A and 160B may include, but are not limited to, doped polysilicon, Al, Cu, Ti, Ta, Ru, W, Mo, Pt, Ni, Co, TiN, TaN, WN, NbN, TiAl, TiAlN, TiSi, TiSiN, TaSi, TaSiN, RuTiN, NiSi, CoSi, IrOx, RuOx or combinations thereof.

The capacitor structures 170A and 170B may be formed on the landing pads 160A and 160B. The capacitor structures 170A and 170B may be arranged to correspond to the landing pads 160A and 160B. The landing pads 160A and 160B may electrically connect the channel layer 130 and the capacitor structures 170A and 170B. The capacitor structures 170A and 170B may each include lower electrodes 173A and 173B, a capacitor dielectric layer 175, and an upper electrode 178.

In some embodiments, the capacitor structures 170A and 170B may provide the semiconductor memory device according to some embodiments as a dynamic memory element (dynamic RAM, DRAM). For example, the capacitor structures 170A and 170B may store the data (charge) inside the capacitor dielectric layer 175, by utilizing a potential difference occurring between the lower electrodes 173A and 173B and the upper electrode 178.

The lower electrodes 173A and 173B may be electrically connected to the landing pads 160A and 160B. Each of the lower electrodes 173A and 173B may have, but are not limited to, a pillar shape extending in the vertical direction Z. In some embodiments, the lower electrodes 173A and 173B may be placed to overlap the landing pads 160A and 160B in the vertical direction Z. For example, a plurality of lower electrodes 173A and 173B may be spaced apart from each other in the column direction Y and the row direction X, and may be arranged in a matrix form.

In some embodiments, the lower electrodes 173A and 173B may be spaced apart from each other in the column direction Y. The lower electrode 173A may be in contact with the upper surface of the first landing pad 160A, and the lower electrode 173B may be in contact with the upper surface of the second landing pad 160B. Therefore, the capacitor structures 170A and 170B may include a first capacitor structure 170A and a second capacitor structure 170B arranged along the column direction Y.

The capacitor dielectric layer 175 may be interposed between the lower electrodes 173A and 173B and the upper electrodes 178. As an example, the capacitor dielectric layer 175 may conformally extend along outer peripheral surfaces of the lower electrodes 173A and 173B and the upper surface of the third interlayer insulation film 116. The upper electrode 178 may be formed on the upper surface of the capacitor dielectric layer 175.

In some embodiments, the upper electrode 178 may be a plate-shaped structure that extends along a plane that intersects the vertical direction Z. As an example, a fourth interlayer insulation film 118 that fills the space between the lower electrodes 173A and 173B may be formed on the capacitor dielectric layer 175. The upper electrode 178 may extend along the upper surface of the fourth interlayer insulation film 118. However, this is only one example, and the fourth interlayer insulation film 118 may be omitted. As another example, the upper electrode 178 may be formed on the capacitor dielectric layer 175 to fill the space between the lower electrodes 173A and 173B.

The lower electrodes 173A and 173B and the upper electrode 178 may each include doped polysilicon, metal, conductive metal nitride, conductive metal silicide, conductive metal oxide, or a combination thereof. For example, the lower electrodes 173A and 173B and the upper electrode 178 may include, but are not limited to, doped polysilicon, Al, Cu, Ti, Ta, Ru, W, Mo, Pt, Ni, Co, TiN, TaN, WN, NbN, TiAl, TiAlN, TiSi, TiSiN, TaSi, TaSiN, RuTiN, NiSi, CoSi, IrOx, RuOx or combinations thereof.

The capacitor dielectric layer 175 may include silicon oxide, silicon oxynitride, a high dielectric constant material having a higher dielectric constant than silicon oxide, or a combination thereof. The high dielectric constant material may include, but is not limited to, hafnium oxide (HfO2), hafnium silicon oxide (HfSiO), hafnium silicon oxynitride (HfSiON), hafnium tantalum oxide (HfTaO), hafnium titanium oxide (HfTiO), hafnium zirconium oxide (HfZrO), zirconium oxide (ZrO2), aluminum oxide (Al2O3) or a combination thereof.

In some embodiments, each of the lower electrode 173A and the lower electrode 173B may include a second conductive pattern 171 and a second barrier conductive film 172. The second conductive pattern 171 and the second barrier conductive film 172 may be sequentially stacked on the landing pads 160A and 160B. For example, the second conductive pattern 171 may have a pillar shape extending in the vertical direction Z on the landing pads 160A and 160B. The second barrier conductive film 172 may conformally extend along the side surfaces and the upper surface of the second conductive pattern 171. The second barrier conductive film 172 may be interposed between the second conductive pattern 171 and the capacitor dielectric layer 175.

The second barrier conductive film 172 may reduce/prevent diffusion of the elements included in the second conductive pattern 171. As an example, the second conductive pattern 171 may include at least one of tungsten (W), aluminum (Al), and copper (Cu), and the second barrier conductive film 172 may include at least one of titanium (Ti), titanium nitride (TiN), tantalum (Ta), and tantalum nitride (TaN).

In some embodiments, the upper electrode 178 may include a third barrier conductive film 177 and a third conductive pattern 176. The third barrier conductive film 177 and the third conductive pattern 176 may be sequentially stacked on the capacitor dielectric layer 175. For example, the third barrier conductive film 177 may conformally extend along the capacitor dielectric layer 175. In some embodiments, the third barrier conductive film 177 may extend between the capacitor dielectric layer 175 and the fourth interlayer insulation film 118.

The third conductive pattern 176 may be a plate-like structure extending along a plane intersecting the vertical direction Z. The third conductive pattern 176 may extend along the uppermost surface of the third barrier conductive film 177. In some embodiments, the third conductive pattern 176 may extend along the upper surface of the fourth interlayer insulation film 118. For example, the upper surface of the fourth interlayer insulation film 118 may be placed at the same level as the uppermost surface of the third barrier conductive film 177.

The third barrier conductive film 177 may reduce/prevent diffusion of the elements included in the third conductive pattern 176. As an example, the third conductive pattern 176 may include at least one of tungsten (W), aluminum (Al), and copper (Cu), and the third barrier conductive film 177 may include at least one of titanium (Ti), titanium nitride (TiN), tantalum (Ta), and tantalum nitride (TaN).

In order to improve the degree of integration of the semiconductor memory device, semiconductor memory devices including a vertical channel transistor with channels extending in the vertical direction are proposed. In order to implement such semiconductor memory devices, a gate insulation layer and a gate electrode may be stacked on the side surfaces of the channel layer extending in the vertical direction. However, in such a case, the channel layer may be damaged or its characteristics may be deteriorated in the process of forming the gate insulation layer and the gate electrode, which can include thermal processes or the like, and may cause a decrease in performance and reliability of the semiconductor memory device.

In the semiconductor memory device according to some embodiments, the channel layer 130 may be formed by being stacked on the gate electrodes 150A and 150B and the gate insulation layer 140. Therefore, a semiconductor memory device with improved performance and reliability may be provided. In addition, the semiconductor memory device according to some embodiments may have two transistor structures for each channel layer 130. For example, as described above, the gate electrodes 150A and 150B may include a first gate electrode 150A and a second gate electrode 150B that are spaced apart from each other in the cell trench 112t. Accordingly, it is possible to provide a semiconductor memory device having higher degrees of integration.

Furthermore, in the semiconductor memory device according to some embodiments, a part of the channel layer 130 may be placed on the upper surface of the first interlayer insulation film 112. For example, as described above, the first extension portion 134A may further extend along the upper surface of the first gate electrode 150A, and the second extension portion 134B may further extend along the upper surface of be the second gate electrode 150B. In such a case, the distance between the landing pads 160A and 160B and the gate electrodes 150A and 150B may be adjusted by the thickness of the channel layer 130. Therefore, it is possible to provide the semiconductor memory device according to some embodiments in which the distance between the landing pads 160A and 160B and the gate electrodes 150A and 150B can be easily adjusted.

The peripheral circuit element PT and the inter-wiring insulation film 210 may be formed on the first substrate 100. The peripheral circuit element PT may control the functions of the semiconductor memory elements formed on the first substrate 100, including control elements and dummy elements. The inter-wiring insulation film 210 may cover the peripheral circuit element PT. In some embodiments, the peripheral circuit element PT may include a fourth conductive pattern 220 and a fifth conductive pattern 230 that are sequentially formed on the upper surface of the first substrate 100. The fourth conductive pattern 220 and the fifth conductive pattern 230 may form various circuit elements for controlling the functions of the semiconductor memory elements. The peripheral circuit element PT may include, for example, not only various active elements such as a transistor, but also various passive elements such as a capacitor, a resistor, and an inductor, and combinations thereof.

In some embodiments, the peripheral circuit element PT and the inter-wiring insulation film 210 may be placed under the first interlayer insulation film 112. For example, the lower insulation film 110 may be stacked on the upper surface of the inter-wiring insulation film 210. The first interlayer insulation film 112 may be stacked on the upper surface of the lower insulation film 110. That is, the semiconductor memory device according to some embodiments may have a CoP (cell on periphery) structure.

In some embodiments, the peripheral circuit element PT may be electrically connected to the conductive line 120. For example, a wiring pattern 240 electrically connected to the peripheral circuit element PT may be formed in the inter-wiring insulation film 210. In addition, a connecting via 250 that penetrates the lower insulation film 110 and electrically connects the conductive line 120 and the wiring pattern 240 may be formed. Therefore, the conductive line 120 may be electrically controlled by the peripheral circuit element PT.

Figure 9:
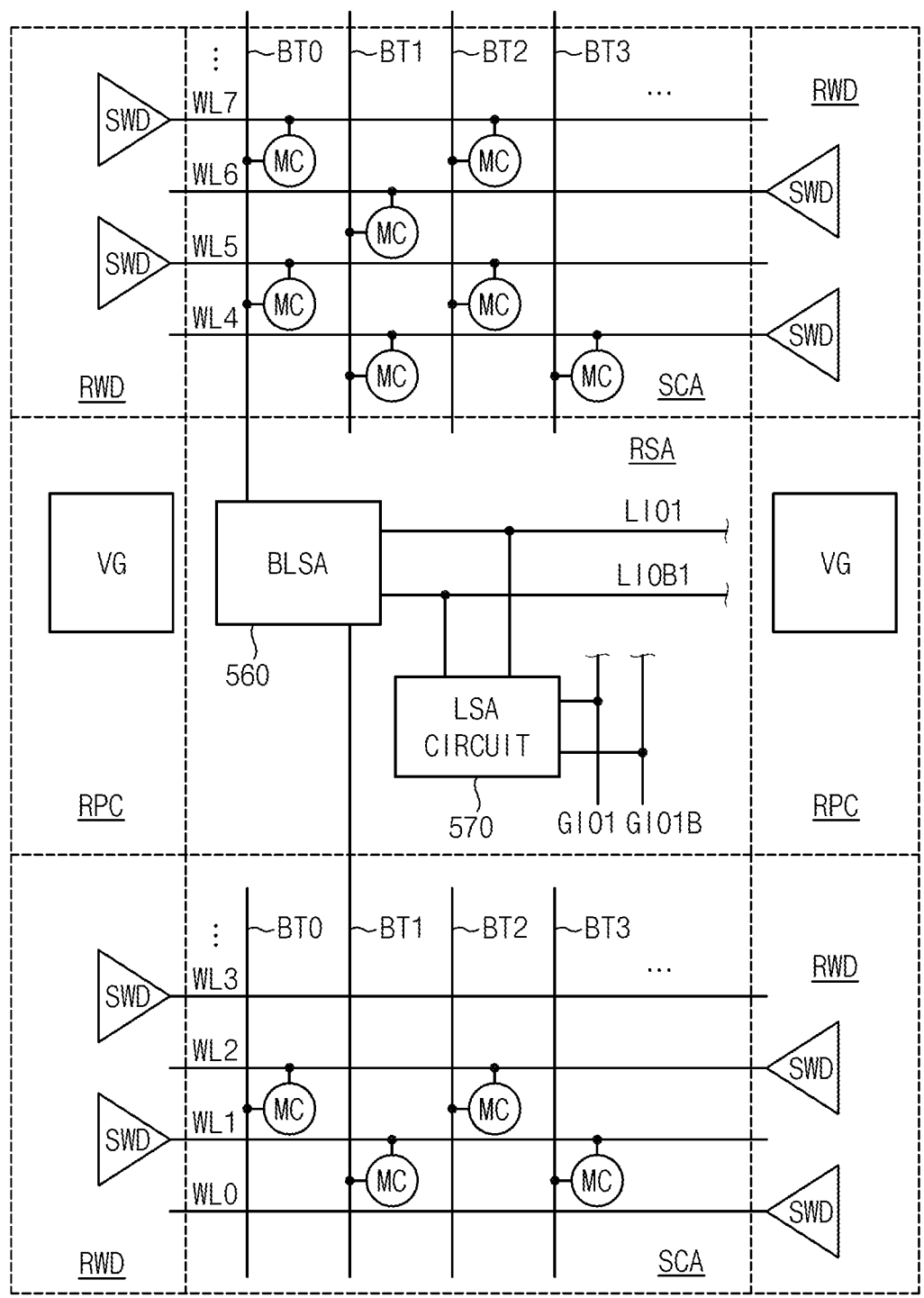
FIG. 9 is a diagram illustrating a schematic configuration of a memory core circuit according to example embodiments.

FIG. 9 is a diagram illustrating a schematic configuration of a memory core circuit according to example embodiments. Referring to FIG. 9, the sub cell arrays SCA, the sense amplifier regions RSA, the wordline driver regions RWD and the power and control regions RPC may be disposed in the memory core circuit. The above-described decoder regions RRD are omitted in FIG. 9. As shown, the sub cell arrays SCA may include a plurality of wordlines WL0~WL7 extending in the row direction, a plurality of bitlines BTL0~BTL3 extending in the column direction, and the memory cells MC disposed at the intersections of the wordlines WL0~WL3 and the bitlines BTL0~BTL3. The wordline driver regions RWD may include a plurality of sub wordline drivers SWD that may respectively drive the wordlines WL0~WL3. The sense amplifier regions RSA may include bitline sense amplifiers BLSA coupled to the bitlines BTL0~BTL3 with the open bitline structure in, and a local sense amplifier (LSA) circuit 570. The bitline sense amplifier BLSA may sense and amplify a voltage difference between the bitlines BTL0~BTL3 to provide the amplified voltage difference to a local I/O line pair L101 and LIOB1. The power circuit to supply power to each sub peripheral circuit and the control circuit to control the operation of each sub peripheral circuit may be disposed in the power and control region RPC. FIG. 9 illustrates voltage drivers VG disposed in the power and control region RPC, but example embodiments are not limited thereto.

Figure 10:
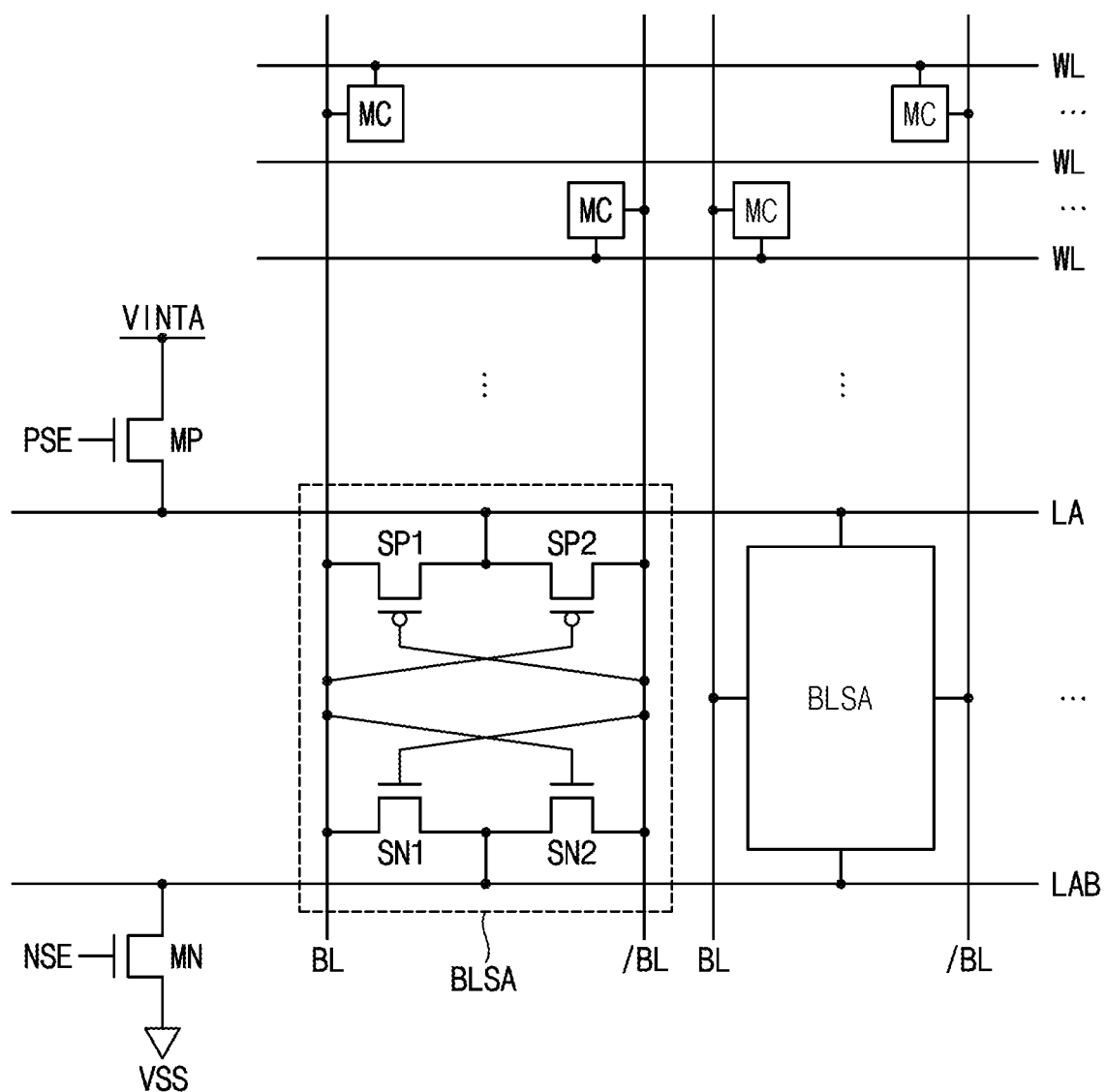
FIG. 10 is a diagram illustrating an example embodiment of a bitline sense amplifier included in the memory core circuit of FIG. 9.

FIG. 10 is a diagram illustrating an example embodiment of a bitline sense amplifier included in the memory core circuit of FIG. 9. As will be understood by those skilled in the art, when a word line WL selected by a row address is activated in the semiconductor memory device, data from a plurality of memory cells MC connected with the word line WL is transferred to a pair of bit lines BL and/BL. Voltage switches MP and MN are turned on in response to a P sensing signal PSE and an N sensing signal NSE to provide respectively supply an external amplifier voltage VINTA and a ground voltage VSSA to a sense amplifier power supply line LA and a sense amplifier ground line LAB. The bitline sense amplifiers BLSA are activated and operate in relation to a voltage difference between the pair of bit lines BL and/BL. As typically implemented, a large number of the bitline sense amplifiers BLSA operate simultaneously. Thus, it is difficult to amplify data from a large number of cells during a short period of time when the external amplifier voltage VINTA is applied as a conventional internal array power supply voltage having a relatively low level. In other words, the bit line sensing speed of the semiconductor memory device decreases in relation to the quantity of data being processed, and ultimately the semiconductor memory device cannot operate at a sufficiently high speed.

In addition to the foregoing limitation, the size of a metal-oxide semiconductor (MOS) transistor implementing the sense amplifier is inevitably reduced as the overall semiconductor memory device is fabricated with a higher degree of device integration. When the size of an MOS transistor of the bitline sense amplifiers BLSA is reduced, it is efficient to reduce the size of p-type MOS (PMOS) transistors SP1 and SP2 which are generally formed larger than the n-type MOS (NMOS) transistors SN1 and SN2 because their inherent current driving capability is small. However, when the size of the PMOS transistors SP1 and SP2 decreases, it is difficult for the bitline sense amplifiers BLSA to properly amplify data to a sufficiently high level. Fortunately, to address the above-mentioned problems, voltage drivers to supply the external amplifier voltage VINTA may be disposed efficiently as will be described below with reference to FIGS. 17 and 18.

Figure 11:
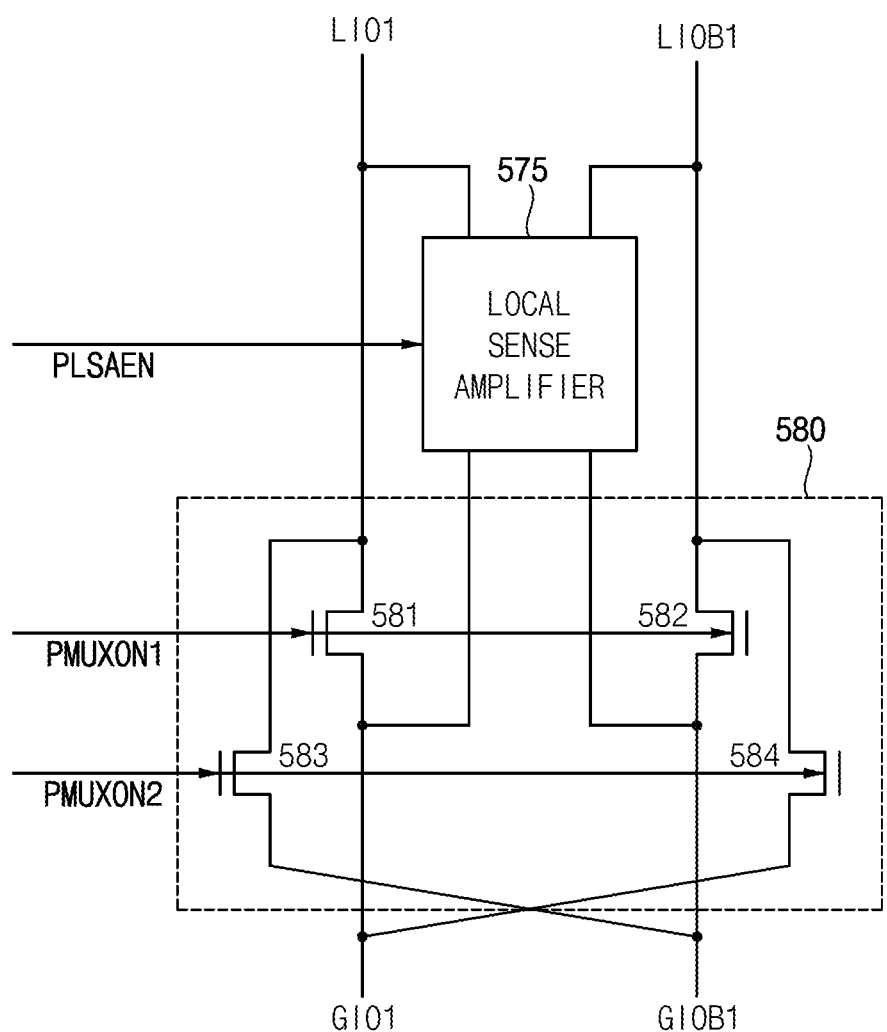
FIG. 11 is a diagram illustrating an example embodiment of a local sense amplifier included in the memory core circuit of FIG. 9.

FIG. 11 is a diagram illustrating an example embodiment of a local sense amplifier included in the memory core circuit of FIG. 9. Referring to FIG. 11, a local sense amplifier circuit 570 may include a local sense amplifier 575 and a local I/O line controller 580. The local sense amplifier 575 may amplify a voltage difference between the local I/O line pair LIO1 and LIOB1 in response to a local sense enable signal PLSAEN and may provide the amplified voltage difference to a global I/O line pair GIO1 and GIOB1. The local I/O line controller 580 may include first through fourth NMOS transistors 581, 582, 583, and 584, and may provide electrical connections between the local I/O line pair LIO1 and LIOB1 and the global I/O line pair GIO1 and GIOB1 in response to a first connection control signal PMUXON1 and a second connection control signal PMUXON2.

For example, when each of the local sense enable signal PLSAEN, the first connection control signal PMUXON1, and the second connection control signal PMUXON2 is a low level, the local sense amplifier 575 may be deactivated and the local I/O line controller 580 may cut off a connection between the local I/O line pair LIO1 and LIOB1 and the global I/O line pair GIO1 and GIOB1.

For example, when each of the first local sense enable signal PLSAEN, the first connection control signal PMUXON1, and the second connection control signal PMUXON2 is a high level, the local sense amplifier 575 may be activated and the local I/O line controller 580 may provide a connection between the local I/O line pair LIO1 and LIOB1 and the global I/O line pair GIO1 and GIOB1.

Figure 12:
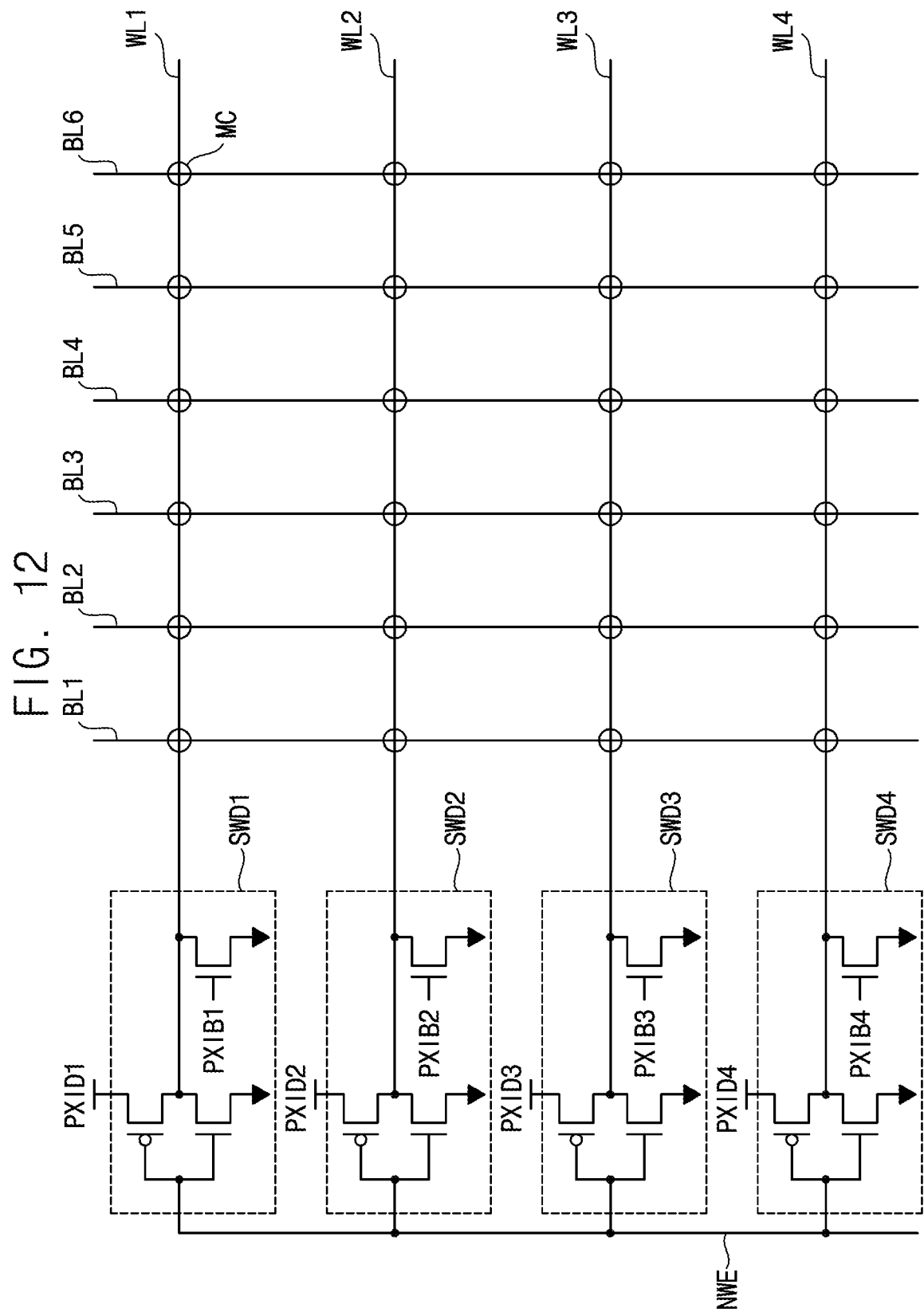
FIG. 12 is a diagram illustrating an example embodiment of a sub wordline driver included in the memory core circuit of FIG. 9.

FIG. 12 is a diagram illustrating an example embodiment of a sub wordline driver included in the memory core circuit of FIG. 9. FIG. 12 illustrates an example that a plurality of wordlines WL1~WL4 are connected to one main wordline NWE through sub wordline drivers SWD1~SWD4. Signals PXID1~PXID4 and PXIB1~PXIB4 are generated by address decoding. The signals PXID1~PXID4 may be generated by the row decoding circuit included in the above-described decoder region RRD. The row decoding circuit generates the signals PXID1~PXID4 by decoding at least a portion of the row address.

Figure 13:
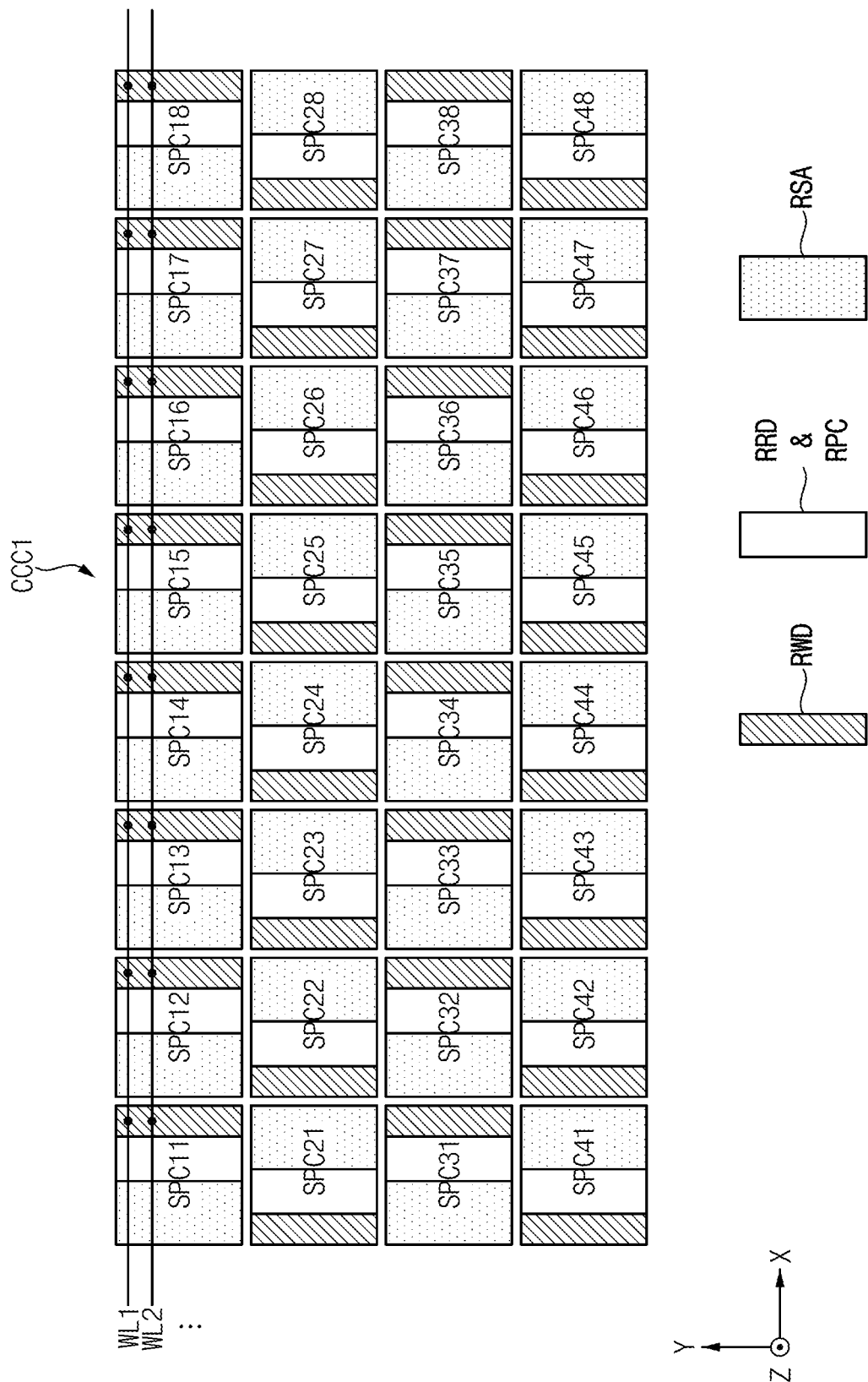
FIGS. 13 and 14 are diagrams illustrating example embodiments of wordline connection of a memory core circuit according to example embodiments.
Figure 14:
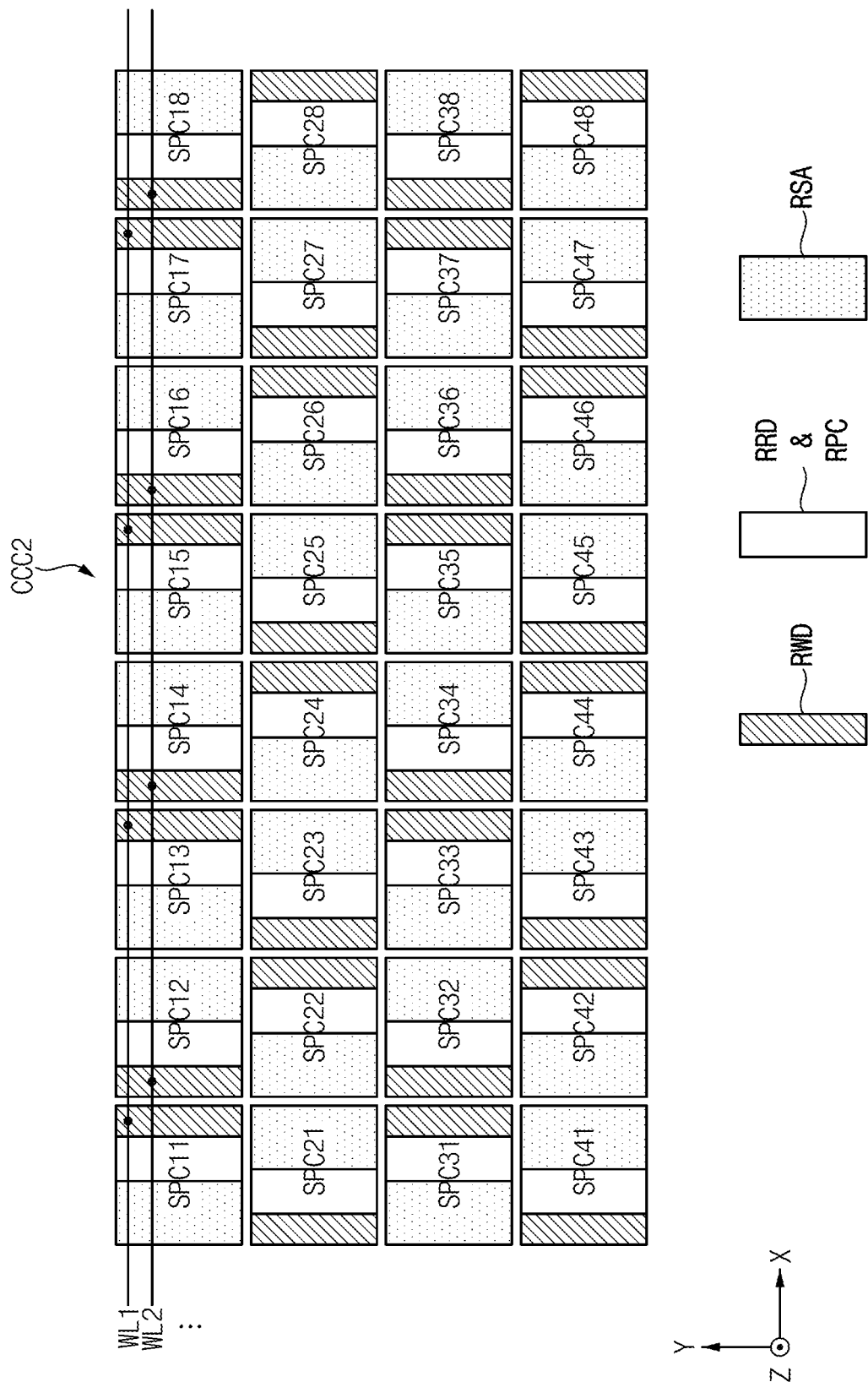

FIGS. 13 and 14 are diagrams illustrating example embodiments of wordline connections within a memory core circuit according to example embodiments. FIGS. 13 and 14 illustrate only a first wordline WL1 and a second wordline WL2 that are adjacent in the column direction Y for convenience of illustration and description.

FIG. 13 illustrates the core control circuit CCC1 having the shift structure as described above with reference to FIG. 3, and the descriptions repeated with FIG. 3 may be omitted. Referring to FIG. 13, each wordline may be connected to wordline driver regions RWD of all of the sub peripheral circuits that are disposed in a same array row. For example, as illustrated in FIG. 13, each of the first wordline WL1 and the second wordline WL2 may be connected to all of the eight wordline driver region RWD respectively included in the eight sub peripheral circuits SPC11~SPC18 that are disposed in the same array row.

FIG. 14 illustrates the core control circuit CCC2 having the mirror structure as described above with reference to FIG. 4, and the descriptions repeated with FIG. 4 may be omitted. Referring to FIG. 14, the first wordline may be connected to the wordline driver regions RWS of all of the odd-numbered sub peripheral circuits that are disposed in a same array row, and a second wordline adjacent in the column direction Y to the first wordline may be connected to wordline driver regions WRD of all of the even-numbered sub peripheral circuits that are disposed in the same array row. For example, as illustrated in FIG. 14, the first wordline WL1 may be connected to the four wordline driver regions RWS of the odd-numbered sub peripheral circuits SPC11, SPC13, SPC 15 and SPC15 that are disposed in a same array row, and the second wordline WL2 adjacent in the column direction Y to the first wordline WL1 may be connected to the four wordline driver regions WRD of the four even-numbered sub peripheral circuits SPC12, SPC14, SPC 16 and SPC18 that are disposed in the same array row. Advantageously, by using the wordline connection as shown in FIGS. 13 and 14, the sub wordline drivers that drive each wordline may be disposed uniformly and thus deviations of voltage drops along each wordline may be reduced.

FIGS. 13 and 14 illustrate the connection of the wordline and the sub wordline driver by a dot for convenience of illustration. The wordline may be connected to the sub wordline driver by various routing schemes. In some example embodiments, as will be described below with reference to FIG. 16, the wordline may be connected to the sub wordline driver included in the wordline driver region RWD through a vertical contact that is disposed in a boundary region between the two sub peripheral circuits SPC adjacent in the row direction X.

Figure 15:
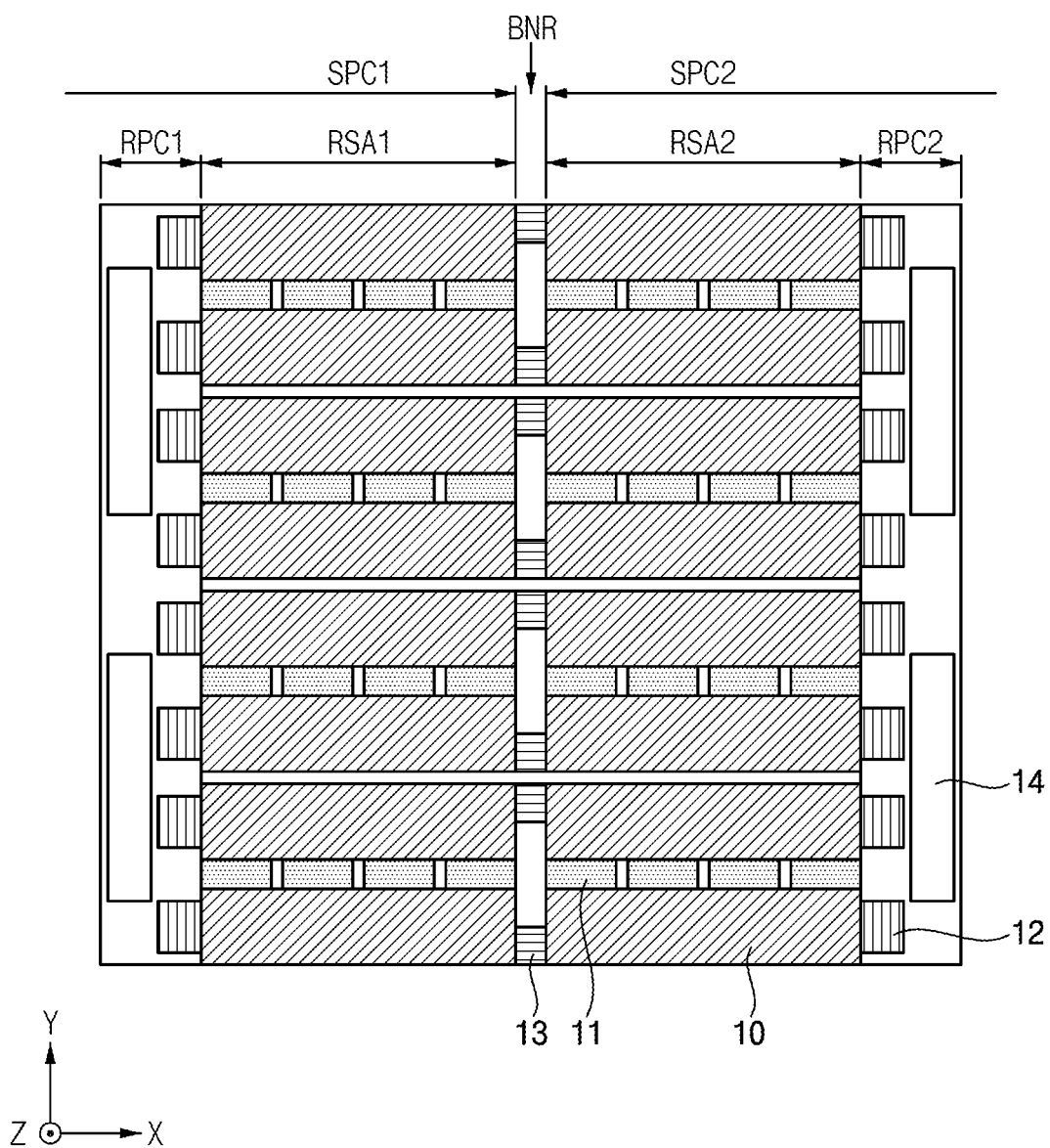
FIG. 15 is a diagram illustrating an example embodiment of a layout of a sense amplifier region and a power and control region of a memory core circuit according to example embodiments.

FIG. 15 is a diagram illustrating an example embodiment of a layout of a sense amplifier region and a power and control region of a memory core circuit according to example embodiments. Referring to FIG. 15, the sense amplifier regions RSA respectively included in the sub peripheral circuits SPC1 and SPC2 may include a plurality of amplifier blocks 10 that are arranged in the column direction Y. The amplifier blocks 10 may include the same number of the bitline sense amplifiers. For example, if 512 bitlines are disposed above each of the sub peripheral circuits SPC1 and SPC2, each of the sense amplifier regions RSA1 and RSA2 may include eight amplifier blocks 10, and each amplifier block 10 may include 64 bitline sense amplifiers.

In some example embodiments, each of the sense amplifier regions RSA1 and RSA2 may further include the local sense amplifiers 11, as described above with reference to FIG. 11, connecting local input-output lines and global input-output lines. As illustrated in FIG. 15, the local sense amplifiers 11 may be disposed between two amplifier blocks 10 that are adjacent in the column direction Y. Each of the power and control regions RPC1 and RPC2 may include a circuit 12 to generate control signals such as the P sensing signal PSE as described above with reference to FIG. 10, and repeaters 14 to distribute the control signals. The voltage switches 13 and the like may be disposed in a boundary region BNR between the sub peripheral circuits SPC1 and SPC2 that are adjacent in the column direction Y.

Figure 16:
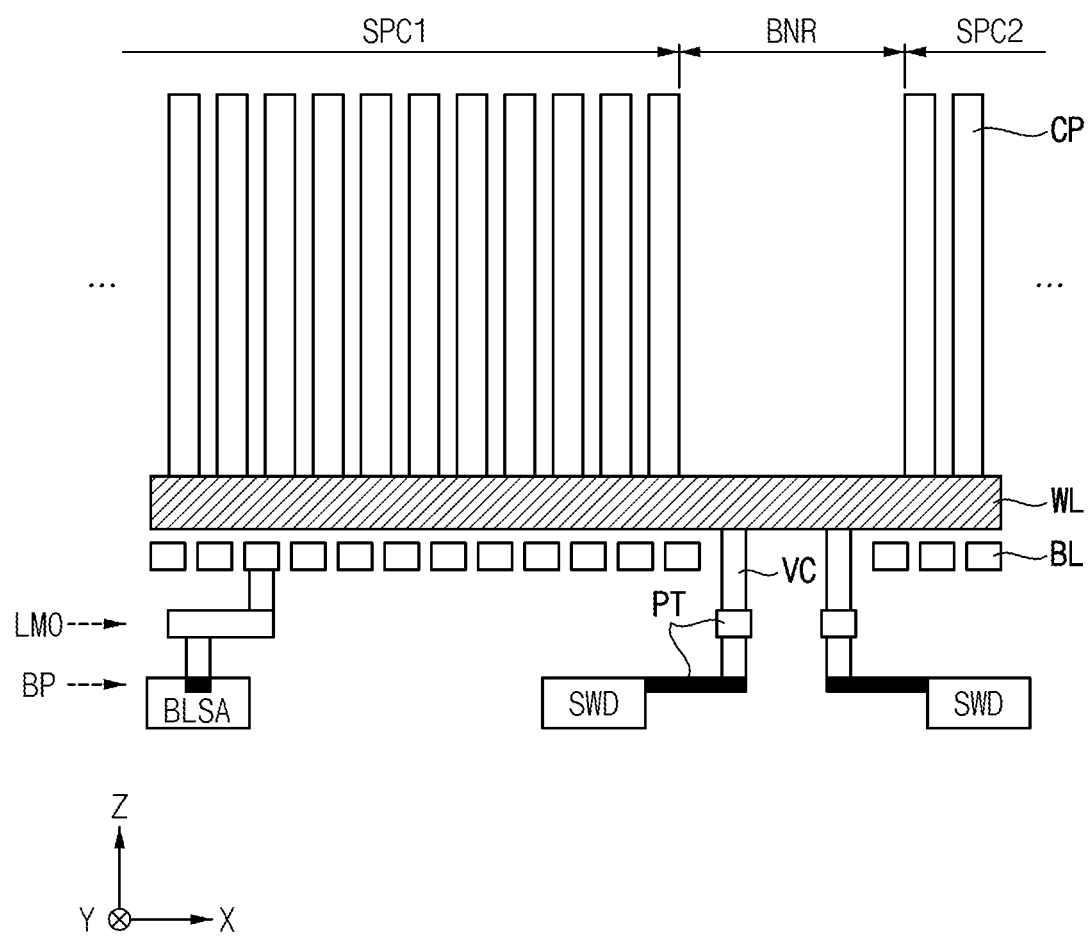
FIG. 16 is a diagram illustrating an example embodiment of connections of wordlines and bitlines of a memory core circuit according to example embodiments.

FIG. 16 is a diagram illustrating an example embodiment of connections of wordlines and bitlines of a memory core circuit according to example embodiments. FIG. 16 illustrates a CoP structure as described with reference to FIGS. 6, 7 and 8, in which cell capacitors CP, the wordlines WL and the bitlines BL are sequentially disposed in the vertical direction Z. The bitline BL may be connected to the bitline sense amplifier BLSA in the sense amplifier region RSA through conduction patterns PT in the conduction layers BP and LMO and vertical contacts VC. The wordline WL may be connected to the sub wordline driver SWD in the wordline driver region RWD through conduction patterns PT in the conduction layers BP and LMO and vertical contacts VC. In some example embodiments, as illustrated in FIG. 16, the wordline WL may be connected to the sub wordline driver SWD included in the wordline driver region RWD through the vertical contact VC that is disposed in a boundary region BNR between two sub peripheral circuits SPC1 and SPC2 adjacent in the row direction X.

Figure 17:
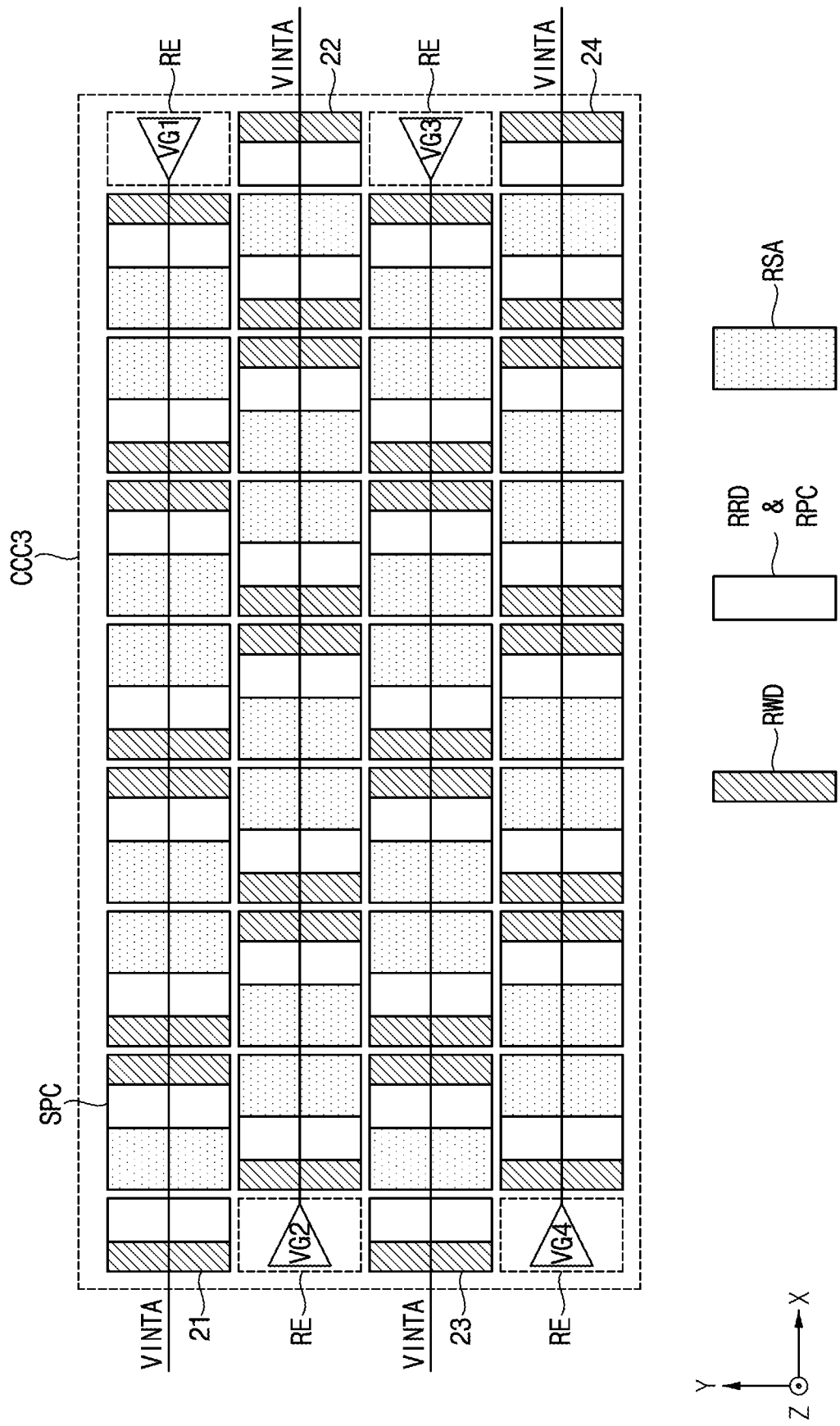
FIGS. 17 and 18 are diagrams illustrating example embodiments of arrangement of voltage drivers included in a memory core circuit according to example embodiments.
Figure 18:
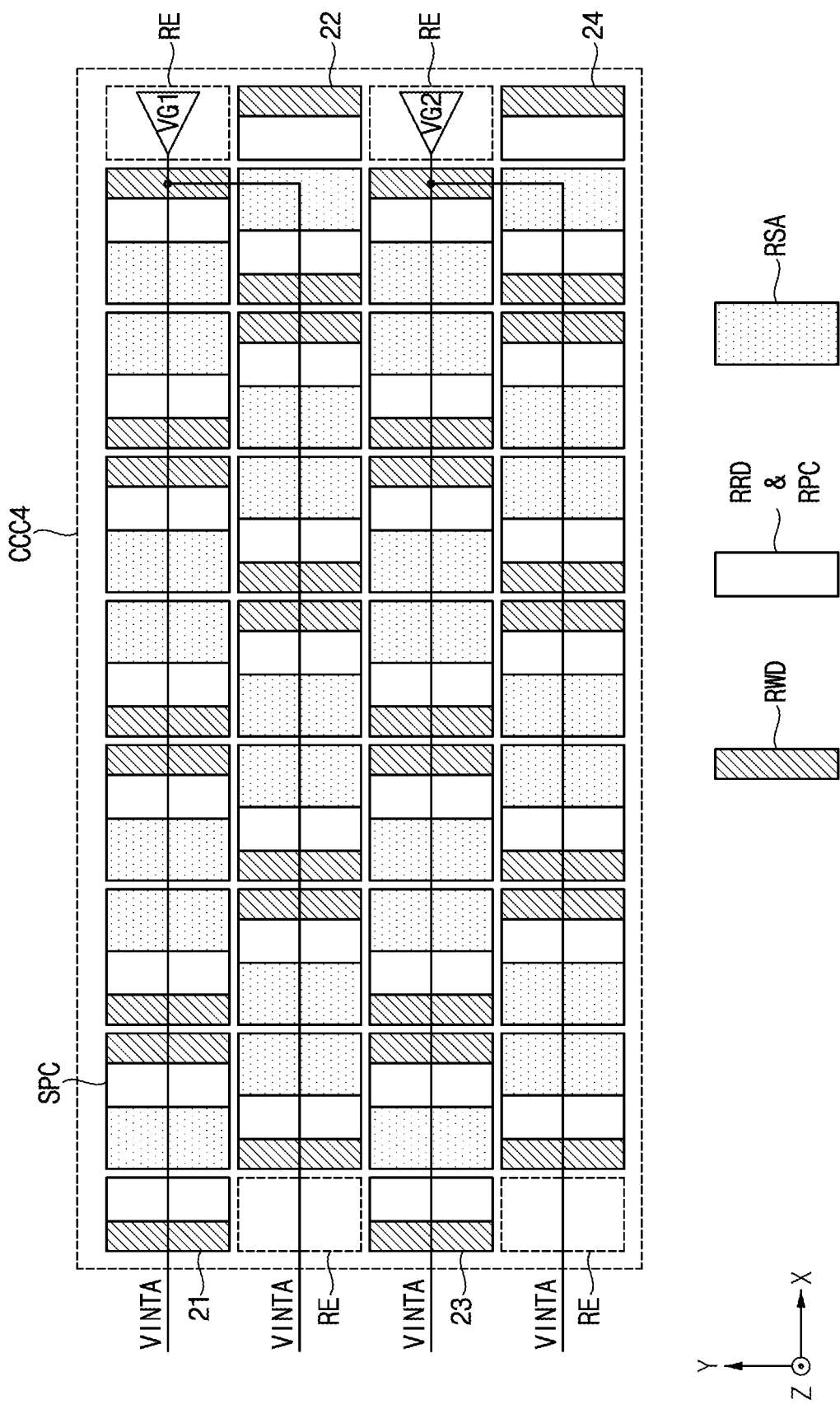

FIGS. 17 and 18 are diagrams illustrating example embodiments of arrangement of voltage drivers included in a memory core circuit according to example embodiments. Referring to FIGS. 17 and 18, each of core control circuits CCC3 and CCC4 may include a plurality of dummy sub peripheral circuits 21~24 that are disposed both ends of each of the core control circuits CCC3 and CCC4 in the row direction X. Each of the dummy sub peripheral circuits 21~24 may include the wordline driver region RWD, the decoder region RRD and the power and control region RPC except the sense amplifier region RSA. The dummy sub peripheral circuits SPC 21~24 may be disposed to compensate for the voltage drop near the end portions in the row direction X of the wordlines in case of the mirror structure as described above with reference to FIG. 4.

In this case, edge regions RE may be secured such that each edge region RE may be between the two dummy sub peripheral circuits that are adjacent in the column direction Y. In some example embodiments, each of the core control circuits CCC3 and CCC4 may include the voltage drivers VG1~VG4 that are disposed in the edge regions RE, to provide the external amplifier voltage VINTA. One voltage driver may be disposed with respect to one array row as illustrated in FIG. 17, or one voltage driver may be disposed with respect to two array rows as illustrated in FIG. 18. Through such efficient disposition of the voltage drivers 21~24, the operation characteristics and the performance of the memory core circuit and the memory device may be enhanced.

Figure 19:
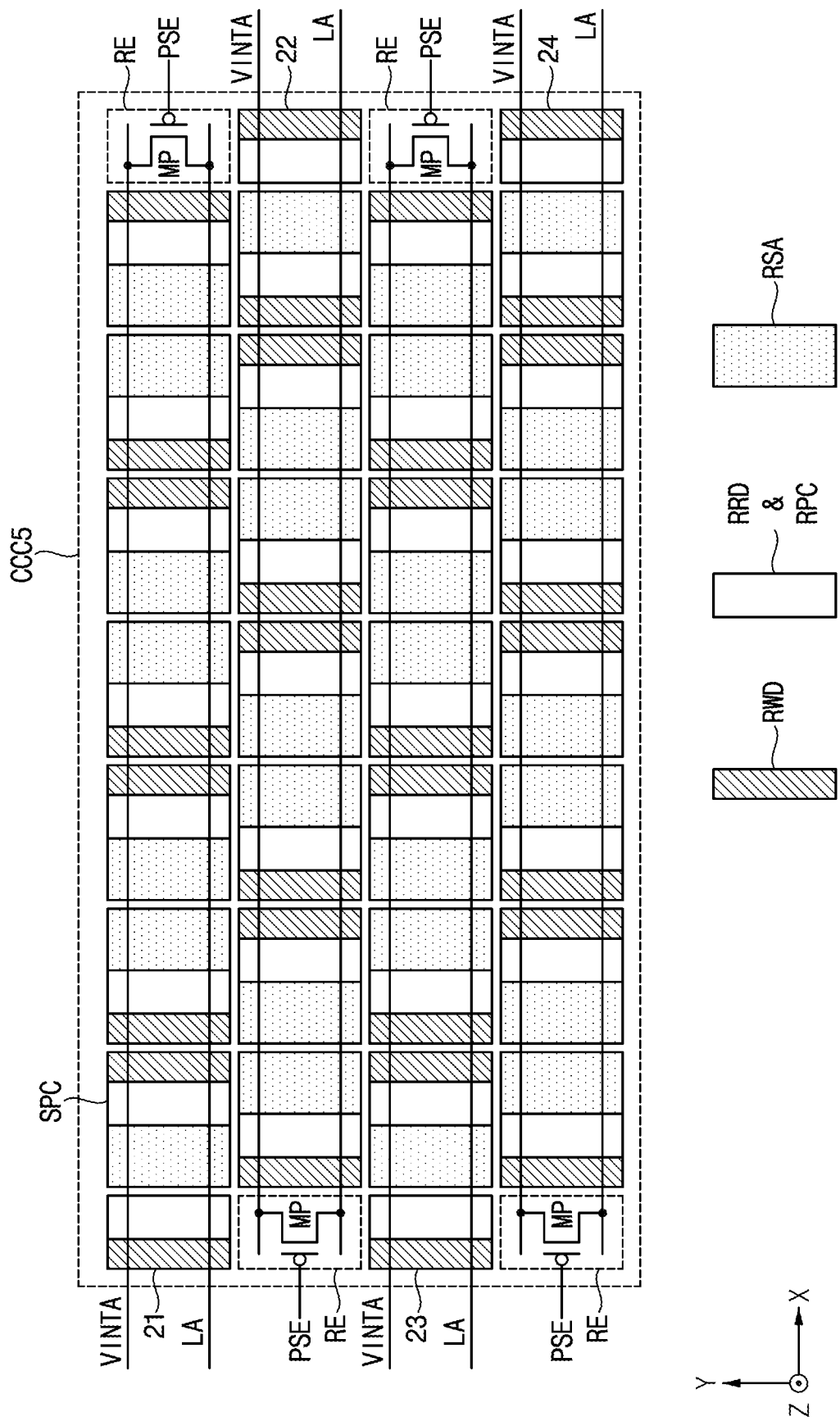
FIGS. 19, 20 and 21 are diagrams illustrating example embodiments of arrangement of voltage switches included in a memory core circuit according to example embodiments.
Figure 20:
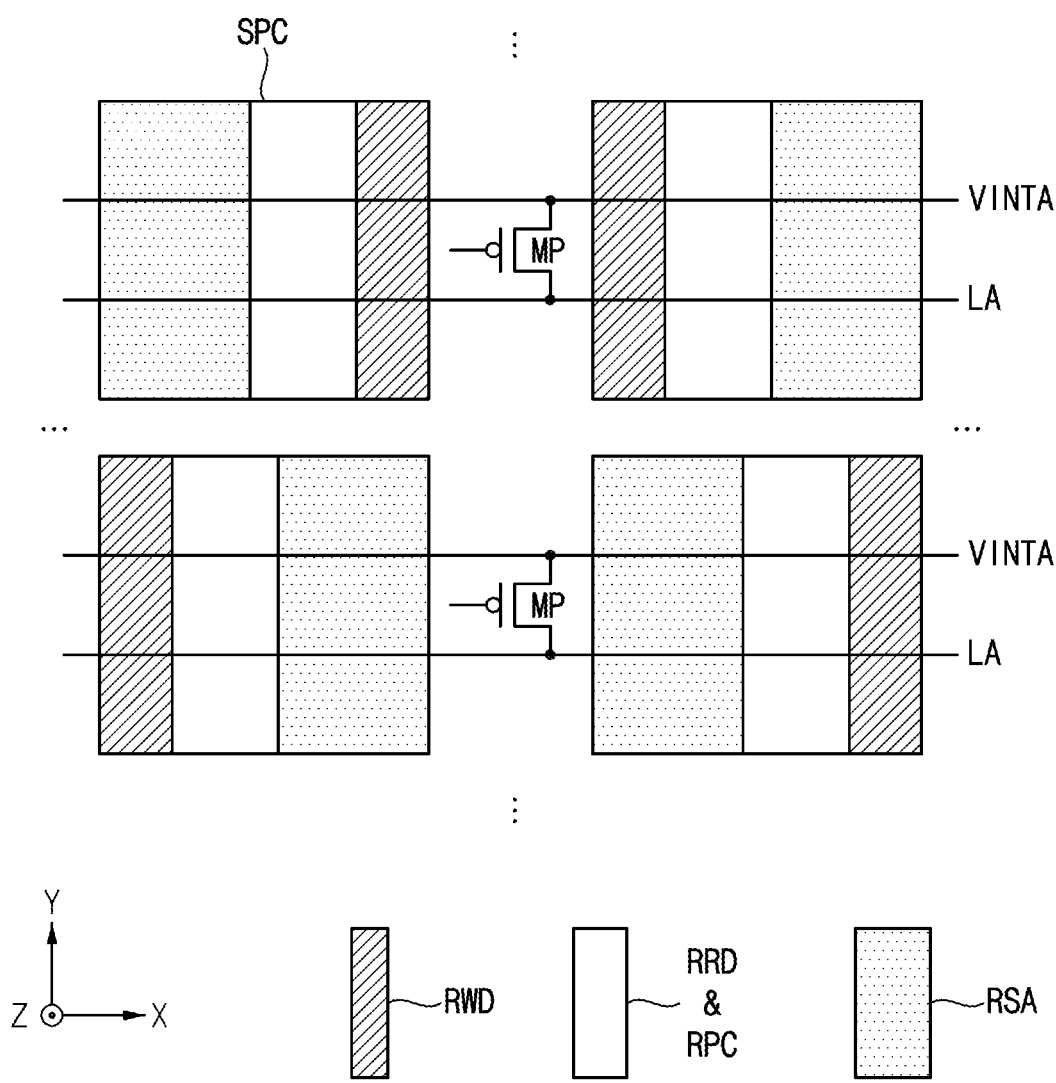
Figure 21:
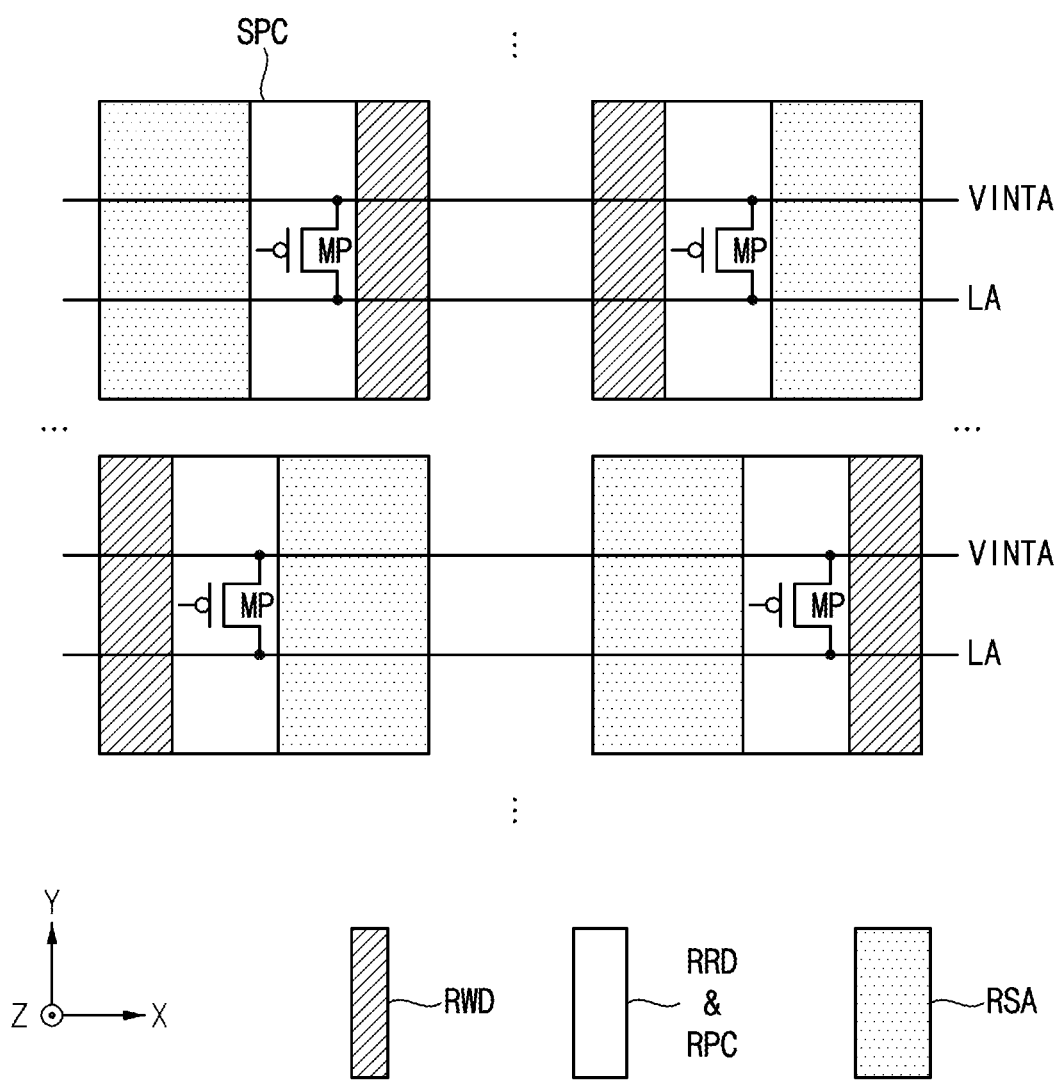

FIGS. 19, 20 and 21 are diagrams illustrating example embodiments of arrangement of voltage switches included in a memory core circuit according to example embodiments. As described with reference to FIG. 10, the voltage switch MP control the connection between the external amplifier voltage VINTA and the sense amplifier power supply line LA in response to the P sensing signal PSE. The voltage switches MP may be disposed efficiently using the layout of the memory core circuit MCC according to example embodiments.

In some example embodiments, as illustrated in FIG. 19, the voltage switches MP may be disposed in the edge regions RE that are secured between the two the dummy sub peripheral circuits adjacent in the column direction among the dummy sub peripheral circuits 21~24. In some example embodiments, as illustrated in FIG. 20, the voltage switches MP may be disposed in the boundary regions between the two sub peripheral circuits SPC that are adjacent in the row direction X. In some example embodiments, as illustrated in FIG. 21, the voltage switches MP may be disposed in the power and control regions RPC.

Figure 22:
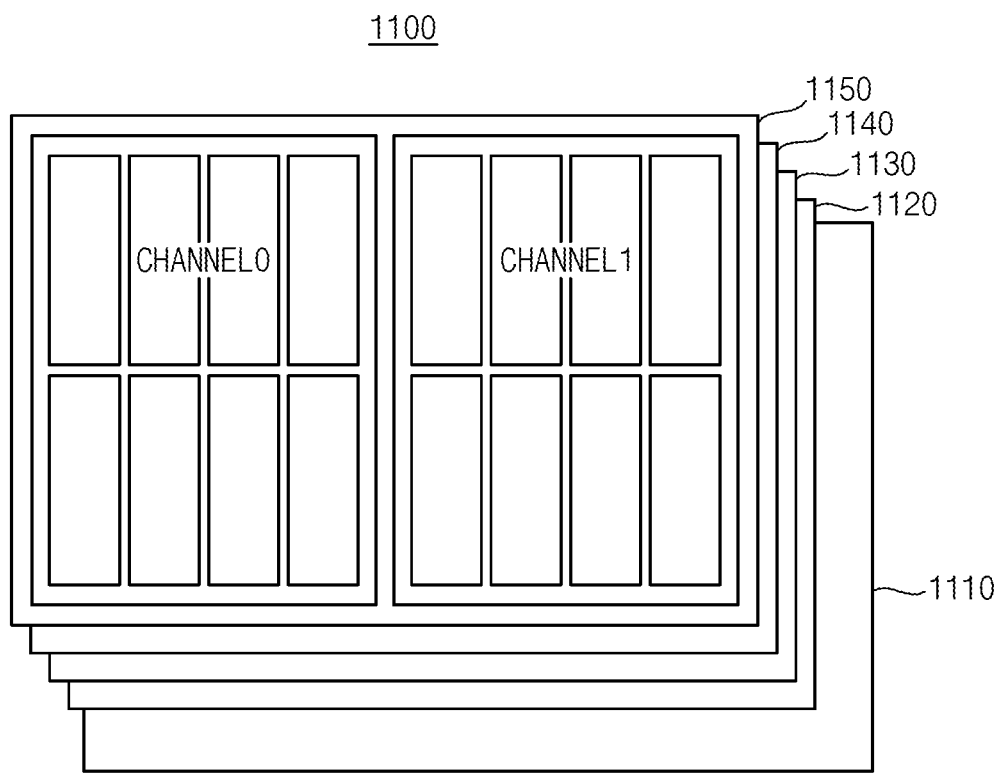
FIG. 22 is a diagram illustrating a memory device according to example embodiments.

FIG. 22 is a diagram illustrating a memory device according to example embodiments. FIG. 22 illustrates an example high bandwidth memory (HBM) organization. Referring to FIG. 20, the HBM 1100 may have a stack of multiple DRAM semiconductor dies 1120, 1130, 1140, and 1150. The HBM of the stack structure may be optimized by a plurality of independent interfaces called channels. Each DRAM stack may support up to 8 channels in accordance with the HBM standards. FIG. 22 shows an example stack containing 4 DRAM semiconductor dies 1120, 1130, 1140, and 1150 and each DRAM semiconductor die supports two channels CHANNEL0 and CHANNEL1. Each channel provides access to an independent set of DRAM banks. Requests from one channel may not access data attached to a different channel. Channels are independently clocked, and need not be synchronous.

The HBM 1100 may further include an interface die 1110 or a logic die at bottom of the stack structure to provide signal routing and other functions. Some function for the DRAM semiconductor dies 1120, 1130, 1140, and 1150 may be implemented in the interface die 1110. Each of the DRAM semiconductor dies 1120, 1130, 1140, and 1150 may have the CoP structure as described with reference to FIGS. 1 through 21.

Figure 23:
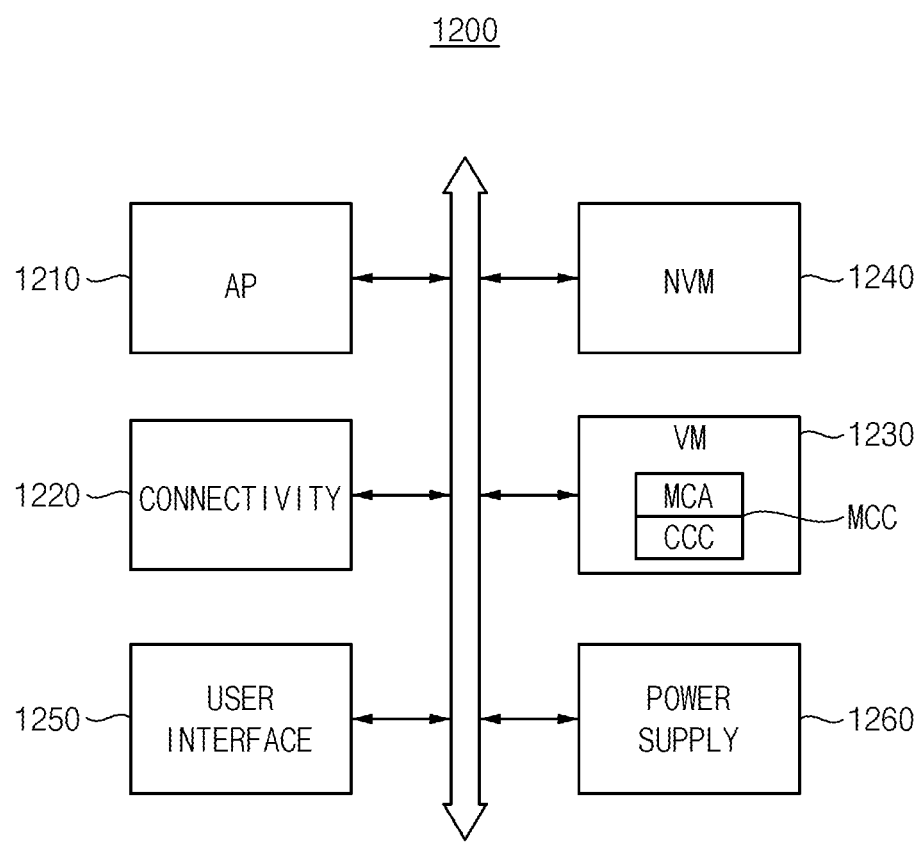
FIG. 23 is a block diagram illustrating a mobile system according to example embodiments.

FIG. 23 is a block diagram illustrating a mobile system according to example embodiments. Referring to FIG. 23, a mobile system 1200 includes an application processor (AP) 1210, a connectivity unit 1220, a volatile memory device (VM) 1230, a nonvolatile memory device (NVM) 1240, a user interface 1250, and a power supply 1260. In some embodiments, the mobile system 1200 may be, for example, a mobile phone, a smart phone, a personal digital assistant (PDA), a portable multimedia player (PMP), a digital camera, a music player, a portable game console, a navigation system, or another type of electronic device.

The application processor 1210 may execute applications, e.g., a web browser, a game application, a video player, etc. The connectivity unit 1220 may perform wired or wireless communication with an external device. The volatile memory device 1230 may store data processed by the application processor 1210 or may operate as a working memory. The nonvolatile memory device 1240 may store a boot image for booting the mobile system 1200. The user interface 1250 may include at least one input device, such as a keypad, a touch screen, etc., and at least one output device, such as a speaker, a display device, etc. The power supply 1260 may supply a power supply voltage to the mobile system 1200.

According to example embodiments, the volatile memory device 1230 may include the core control circuit CCC as described above with reference to FIGS. 1 through 21. The memory core circuit MCC may have the CoP structure such that the core control circuit CCC is disposed under the memory cell array MCA.

As described above, the memory core circuit and the memory device according to example embodiments may reduce the size of the memory core circuit through the CoP structure in which the core control circuit is disposed efficiently, and enhance the design margin of the memory core circuit by relieving the length limit of the bitline sense amplifiers. In addition, the operation characteristics and the performance of the memory core circuit and the memory device may be enhanced through the efficient arrangement of the voltage drivers.

Embodiments herein may be applied to a memory device and systems including a memory device. For example, the present inventive concept may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A memory core circuit, comprising:
   a memory cell array having a plurality of sub cell arrays therein, which are arranged in a matrix of sub cell array rows and sub cell array columns; and
   a core control circuit having a plurality of sub peripheral circuits therein, which are arranged such that each sub peripheral circuit extends underneath a corresponding sub cell array within the plurality of sub cell arrays;
   wherein each sub cell array includes a plurality of memory cells therein, which are connected to a plurality of wordlines and a plurality of bitlines; and
   wherein each sub peripheral circuit includes:
      a plurality of sub wordline drivers, which are respectively configured to drive a corresponding wordline within the plurality of wordlines;
      a plurality of bitline sense amplifiers, which are respectively configured to sense voltages on a corresponding bitline within the plurality of bitlines;
      a row decoding circuit configured to control a corresponding plurality of sub wordline drivers and select one of the plurality of wordlines in response to an address of the selected one of the plurality of wordlines;
      a power circuit configured to supply power within the sub peripheral circuit; and
      a control circuit configured to control operation of the sub peripheral circuit.

2. The memory core circuit of claim 1, wherein each sub peripheral circuit is partitioned into:
   a wordline driver region including the plurality of sub wordline drivers;
   a sense amplifier region including the plurality of bitline sense amplifiers;
   a decoder region including the row decoding circuit; and
   a power and control region including the power circuit and the control circuit.

3. The memory core circuit of claim 2, wherein the wordline driver region, the sense amplifier region, the decoder region and the power and control region are arranged in a row direction.

4. The memory core circuit of claim 2,
   wherein the wordline driver region and the sense amplifier region are disposed at both ends in a row direction of each sub peripheral circuit;
   wherein the decoder region extends adjacent to the wordline driver region in the row direction, and between the wordline driver region and the sense amplifier region; and
   wherein the power and control regions extend adjacent to the sense amplifier region in the row direction, and between the wordline driver region and the sense amplifier region.

5. The memory core circuit of claim 2, wherein an area of the sense amplifier region is about half an area of each sub peripheral circuit.

6. The memory core circuit of claim 2, wherein the core control circuit has a shift structure such that, with respect to a first sub peripheral circuit and a second sub peripheral circuit that are adjacent in a row direction, the wordline driver region of the first sub peripheral circuit extends adjacent, in the row direction, to the sense amplifier region of the second sub peripheral circuit.

7. The memory core circuit of claim 6, wherein each wordline is respectively connected to corresponding wordline driver regions of all of the sub peripheral circuits arranged into an equivalent row thereof.

8. The memory core circuit of claim 6, wherein, with respect to a third sub peripheral circuit and a fourth sub peripheral circuit that are adjacent to each other in a column direction, the sense amplifier region of the third peripheral circuit extends adjacent, in the column direction, to the wordline driver region of the fourth sub peripheral circuit.

9. The memory core circuit of claim 2, wherein the core control circuit has a mirror structure such that, with respect to a first sub peripheral circuit and a second sub peripheral circuit that are adjacent in a row direction, (i) the wordline driver region of the first sub peripheral circuit is adjacent, in the row direction, to the wordline driver region of the second sub peripheral circuit, or (ii) the sense amplifier region of the first sub peripheral circuit is adjacent, in the row direction, to the sense amplifier region of the second sub peripheral circuit.

10. The memory core circuit of claim 9,
    wherein a first wordline is connected to wordline driver regions of all of the odd-numbered sub peripheral circuits that are disposed in an equivalent row of sub peripheral circuits; and
    wherein a second wordline adjacent in a column direction to the first wordline is connected to wordline driver regions of all even-numbered sub peripheral circuits that are disposed in an equivalent row of sub peripheral circuits.

11. The memory core circuit of claim 2, wherein the sense amplifier region includes a plurality amplifier blocks arranged in a column direction, said plurality of amplifier blocks having the same number of bitline sense amplifiers therein.

12. The memory core circuit of claim 11, wherein the sense amplifier region further includes local sense amplifiers connecting local input-output lines and global input-output lines; and wherein the local sense amplifiers are disposed between two amplifier blocks that are adjacent to each other in the column direction.

13. The memory core circuit of claim 2, wherein the core control circuit further includes:
    a plurality of dummy sub peripheral circuits that are disposed at both ends of the core control circuit in a row direction, each dummy sub peripheral circuit includes wordline driver region, the decoder region and the power and control region.

14. The memory core circuit of claim 13, wherein the core control circuit further includes voltage drivers that extend in edge regions, such that each edge region is between two dummy sub peripheral circuits that are adjacent to each other in a column direction.

15. The memory core circuit of claim 2, wherein each wordline is connected to the sub wordline driver included in the wordline driver region, using a vertical contact that is disposed in a boundary region between two sub peripheral circuits, which extend adjacent to each other in a row direction.

16. The memory core circuit of claim 1, wherein each memory cell includes a vertical channel transistor, and a cell capacitor extending above the vertical channel transistor.

17. A memory core circuit, comprising:
- a memory cell array having a plurality of sub cell arrays therein, which are arranged into a matrix of sub cell array rows and sub cell array columns; and
- a core control circuit having a plurality of sub peripheral circuits therein, which are arranged with each sub peripheral circuit extending underneath each corresponding sub cell array within the plurality of sub cell arrays;
- wherein each sub cell array includes a plurality of memory cells respectively connected to a plurality of wordlines and a plurality of bitlines; and
- wherein each sub peripheral circuit includes:
  - a wordline driver region including a plurality of sub wordline drivers;
  - a sense amplifier region including a plurality of bitline sense amplifiers;
  - a decoder region including a row decoding circuit; and
  - a power and control region including a power circuit and a control circuit.

18. The memory core circuit of claim 17,
- wherein the wordline driver region and the sense amplifier region are disposed at both ends in a row direction of each sub peripheral circuit;
- wherein the decoder region extends adjacent to the wordline driver region, in the row direction, and between the wordline driver region and the sense amplifier region; and
- wherein the power and control region extends adjacent, in the row direction, the sense amplifier region, and between the wordline driver region and the sense amplifier region.

19. A memory device, comprising:
- a memory core circuit on a substrate, said memory core circuit comprising:
  - a memory cell array including a plurality of sub cell arrays that are arranged into a matrix containing a plurality of sub cell array rows and a plurality of sub cell array columns; and
  - a core control circuit having a plurality of sub peripheral circuits therein, which are each arranged underneath a corresponding sub cell array within the plurality of sub cell arrays;
- wherein each sub cell array includes a plurality of memory cells respectively connected to a plurality of wordlines and a plurality of bitlines; and
- wherein each sub peripheral circuit includes:
  - a wordline driver region including a plurality of sub wordline drivers;
  - a sense amplifier region including a plurality of bitline sense amplifiers;
  - a decoder region including a row decoding circuit; and
  - a power and control region including a power circuit and a control circuit.

20. The memory device of claim 19, wherein the wordline driver region, the sense amplifier region, the decoder region and the power and control region are arranged in a row direction.

* * * * *